United States Patent [19]

Namba et al.

[11] Patent Number: 5,555,169
[45] Date of Patent: Sep. 10, 1996

[54] COMPUTER SYSTEM AND METHOD FOR CONVERTING A CONVERSATIONAL STATEMENT TO COMPUTER COMMAND LANGUAGE

[75] Inventors: Yasuharu Namba, Yao; Hiroshi Kinukawa, Machida; Hiroshi Tsuji, Itami; Satoshi Wakayama, Sakai, all of Japan

[73] Assignee: Hitachi, Ltd., Tokyo, Japan

[21] Appl. No.: 62,951

[22] Filed: May 14, 1993

[30] Foreign Application Priority Data

May 20, 1992 [JP] Japan ................................. 4-152946

[51] Int. Cl.⁶ ...................................................... G06F 17/27
[52] U.S. Cl. .......................................................... 364/419.08
[58] Field of Search ........................ 364/419.08, 419.19, 364/419.20, 419.01, 419.02; 395/934

[56] References Cited

U.S. PATENT DOCUMENTS

| | | | |
|---|---|---|---|
| 4,736,296 | 4/1988 | Katayama et al. | 364/419.08 |
| 4,914,590 | 4/1990 | Loatman et al. | 364/419.08 |
| 4,931,935 | 6/1990 | Ohira et al. | 364/419.08 |
| 4,974,191 | 11/1990 | Amirghodsi et al. | |
| 4,994,967 | 2/1991 | Asakawa | 364/419.08 |
| 5,083,268 | 1/1992 | Hemphill | 364/419.08 |
| 5,197,005 | 3/1993 | Shwartz et al. | |
| 5,237,502 | 8/1993 | White et al. | 364/419.01 |
| 5,255,386 | 10/1993 | Prager | 364/419.08 |
| 5,282,265 | 1/1994 | Rohra Suda et al. | 364/419.08 |
| 5,321,608 | 6/1994 | Namba et al. | 364/419.08 |

*Primary Examiner*—Robert A. Weinhardt
*Attorney, Agent, or Firm*—Fay, Sharpe, Beall, Fagan, Minnich & McKee

[57] ABSTRACT

An input device (12) receives a natural language or conversational statement in the form of a character string (1). A processor (14) performs a natural language analysis (2) to convert the input natural language into a command language instruction for a computer program. A morphological analysis (3) compares words of the input character string with contents of a dictionary (10) to convert the input words into preselected words indicated by the dictionary which are output as another character string. In a semantic or syntax analysis (4; FIG. 9), one of the inputted and another character strings are analyzed to generate a corresponding chained functions structure (FIGS. 2, 3). From knowledge (FIG. 5, 7) described by the plurality of chained function structures and from rules stored in knowledge memory (11), a new character string is generated. If the new character string is in command language, the command is executed (7). If the new character string is not in command language, it is reanalyzed (8, 9) to generate yet another character string. In this manner, instructions can be input by a user in any of a multiplicity of national languages in conversational format and converted into appropriate command instructions for an executed computer program.

29 Claims, 18 Drawing Sheets

FIG. 13
CONDITION PART :
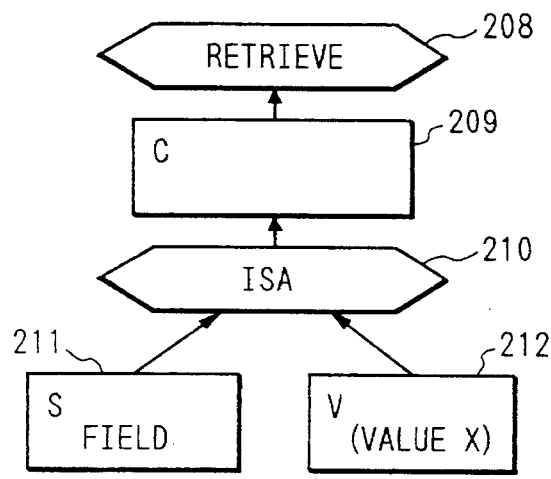
CONSEQUENT PART :
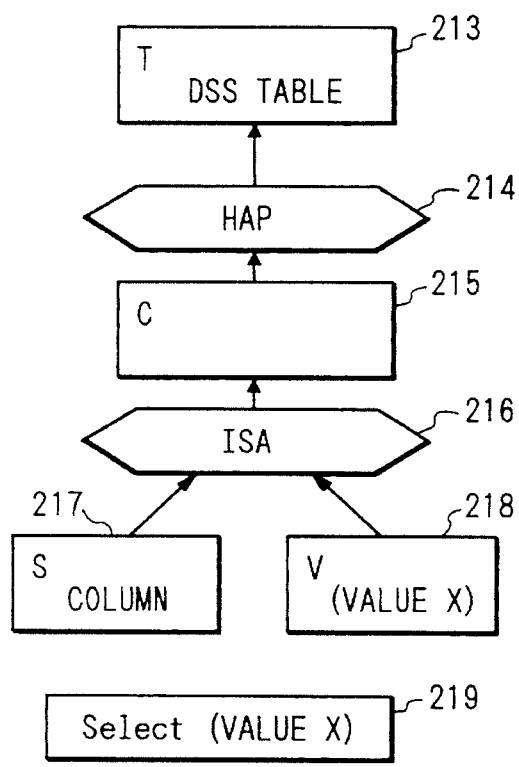

CONDITION PART :

CONDITION PART:

CONDITION PART:

COMPUTER SYSTEM AND METHOD FOR CONVERTING A CONVERSATIONAL STATEMENT TO COMPUTER COMMAND LANGUAGE

BACKGROUND OF THE INVENTION

1. Field of the Invention

The present invention relates to a method and system of natural language processing of a natural language interface for managing an interface between a computer and a human being in natural language.

2. Description of the Prior Art

The technique relating to the present invention is described in Japanese Patent Application Laid-Open No. 62-75731, "Commanding Apparatus for an Information Processor".

Input data is inputted in natural language. The input data is parsed an operating sequence corresponding to each word contained in the parsed input data is inferred on the basis of the word. The inferred operating sequence is the executed.

According to the above prior art, the natural language inputted by a user requires a word to which there is an operating sequence which allows the computer directly to operate. It is difficult to analyze a natural language text similar to a conversational statement such as goal representation or macro representation which is inputted by the user.

SUMMARY OF THE INVENTION

An object of the present invention is to provide a method and system of natural language processing for an input which is received in a natural language text which allows a computer to operate in correspondence to the input. More particularly a method and system of natural language processing is provided which adds or replaces the input with a different word string in natural language. The replacement word string relates to the meaning of the inputted word string. The inputted word string is parsed, even if it cannot be converted partially into a command language. The parsed word string is converted to the command language for the process to be executed.

Another object of the present invention is to provide a method and system of natural language processing for mounting a standard natural language interface to various application systems which use computers.

A further object of the present invention will be understood from this specification and accompanying drawings by those who are skilled in the art in the field of the invention.

To accomplish the above objects, the present invention presents a natural language processing computer system The computer system has a dictionary and a knowledge data base including a plurality of rules for changing meaning structure. The computer system reads knowledge which is described in a chained functions structure for defining the concept and structure of knowledge data elements installed in the above knowledge data base. In response to reading the knowledge and structure of knowledge data, the computer system generates a word string or phrase in natural language, analyzes the syntax of the generated word string or phrase, analyzes the meaning by searching the knowledge described in the above chained functions structure on the basis of at least one of the concepts. Typical concepts include the concept representing operating objects of the above syntax analysis result, the concept representing conditions of the above syntax analysis result, and the concept representing commands. The computer system then generates an intermediate meaning representation which is represented by a combination of chained functions structures of at least one knowledge on the basis of the above semantic analysis result. The computer system generates at least one of a new character string in natural language, an intermediate representation for obtaining a command language, and the command language itself on the basis of the above generated intermediate meaning representation.

More in detail, concepts possessed by elements of natural language constituting an inputted word string are extracted from the word string. A chained function structure representing the relationship between the concepts is generated on the basis of these concepts with reference to knowledge depending on the field, system, command language, and discourse.

On the basis of knowledge accompanying the knowledge which is referred to when the chained functions structure is generated, a different word string in natural language and a command language are generated. The generated command language is executed. The obtained different word string in natural language is subjected to semantic analysis once again. When a command language is generated, it is executed. Furthermore, when a different character string in natural language is generated, its meaning is analyzed. By doing this, the above objects are accomplished.

In the above description, the normal interactiveness is taken into account as an interface between a computer and human being, so that execution results are outputted to the output device. However, the execution results may not be outputted to the output device.

According to the aforementioned structure, the present invention has the following functional operation. Even if the inputted character string cannot be converted partially into the command language, by executing semantic analysis by adding or replacing a different character string in natural language relating to the meaning of the inputted character string, the above computer system can convert the processing to be executed into the command language finally.

The natural language inputted by the user contains many representations which are difficult to analyze by the prior art such as goal representation for allowing the computer directly to operate and macro representation. According to the present invention, however, the representations are subjected to semantic analysis and converted to representations of means and methods for operation (i.e., explanation or change of expression for the same meaning). Therefore, the natural language to be inputted may be represented as a conversational statement.

The representation before conversion and the representation after conversion are natural language which is used usually, so that the correspondence relationship before and after conversion can be defined and corrected easily.

Furthermore, as to knowledge of the relationship between a command language which is used to allow the computer to operate and a natural language, only by preparing only most primitive knowledge beforehand, a natural language text representing a higher command can be interpreted.

A user who uses the method or system of natural language processing of the present invention can operate a computer based upon a natural language (English, Japanese, etc.) of daily use.

According to the present invention, as mentioned above, without a formal language (a special language or command which is determined for a computer) and a command language (a command in a predetermined format which is determined for a computer) being used, by providing input in a usual natural language (it is generally a text but may be words) such as Japanese or English, it is possible to allow the computer to perform a desired operation.

The foregoing and other objects, advantages, manner of operation and novel features of the present invention will be understood from the following detailed description when read in connection with the accompanying drawings.

BRIEF DESCRIPTION OF THE DRAWINGS

FIG. 13 is a drawing showing an actual example of "the meaning structure changing rule" which defines "Retrieve (something)".

DETAILED DESCRIPTION OF THE PREFERRED EMBODIMENTS

Next, the embodiments of the present invention will be explained in detail with reference to the accompanying drawings.

This embodiment is an example that the present invention is applied to a decision support system. The decision support system is a system that a user can instruct execution of a data base retrieval function or a function for drawing a graph or making a list of results obtained by execution of the data base retrieval function and for displaying, erasing, or editing the results furthermore, for example, so as to make a decision. EXCEED2 (manufactured by Hitachi, Ltd., Japan) is an actual example of such a decision support system. To operate such a decision support system when the present invention is not applied, it is necessary for the user to input the prepared language and command. The prepared language or command is called a command language in the explanation of this specification.

According to this embodiment, natural language texts which are inputted into the computer by the user are mostly statements for instructing operations (statements for instructing operations of the computer). For example, an inquiry about the computer from a viewpoint of the user is also included in the commands.

Figure 1:
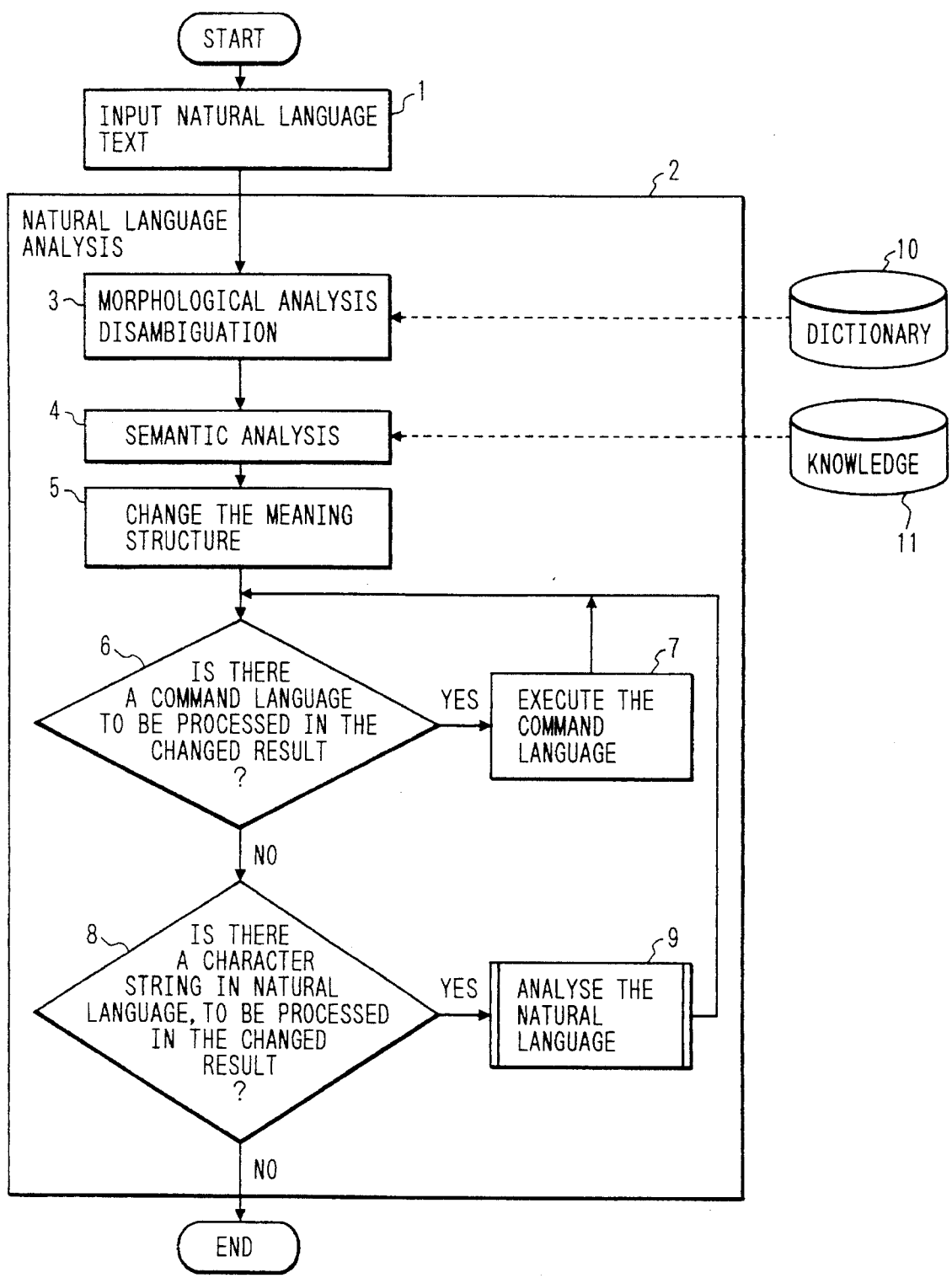
FIG. 1 is a drawing showing the outline of processing of an embodiment of the present invention.

FIG. 1 shows the outline of processing of an embodiment of the present invention.

First, a natural language text is entered from the input device. For example, "Sum up the sales amounts" is inputted by a user.

Next, the meaning of the natural language text is analyzed 2 on the basis of the input text, and a command language or a new character string in natural language is generated. When a command language is generated, it is executed. When a new character string in natural language is generated, the natural language is analyzed.

First, a morphological analysis is made, and a disambiguation is performed, and the syntax is analyzed 3 by comparing words of the input text with the contents of a dictionary 10. As a result, "the sales amounts" and "Sum up" are obtained, for example, as a concept of an element of natural language.

Figure 2:
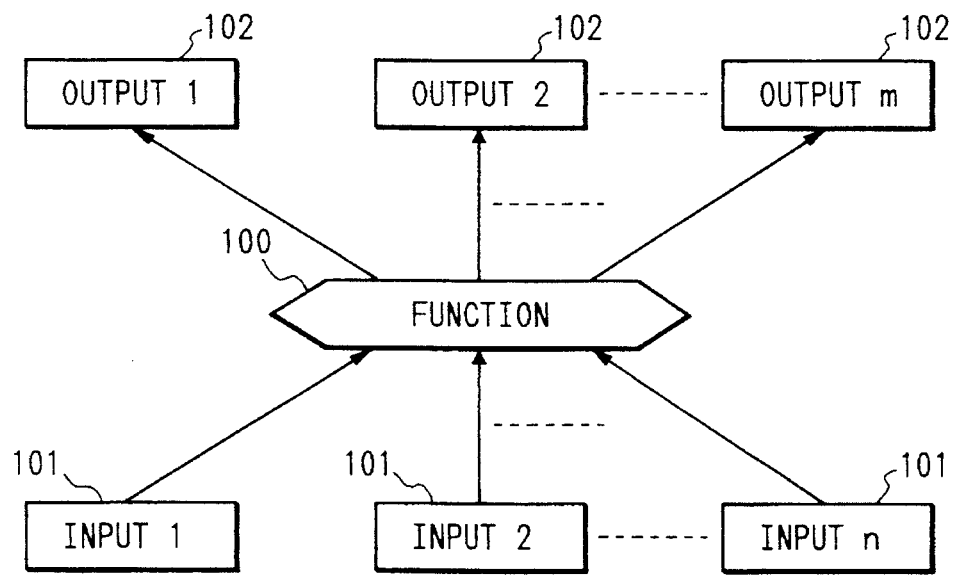
FIG. 2 is an illustration of the basic structure of the chained functions structure.
Figure 3:
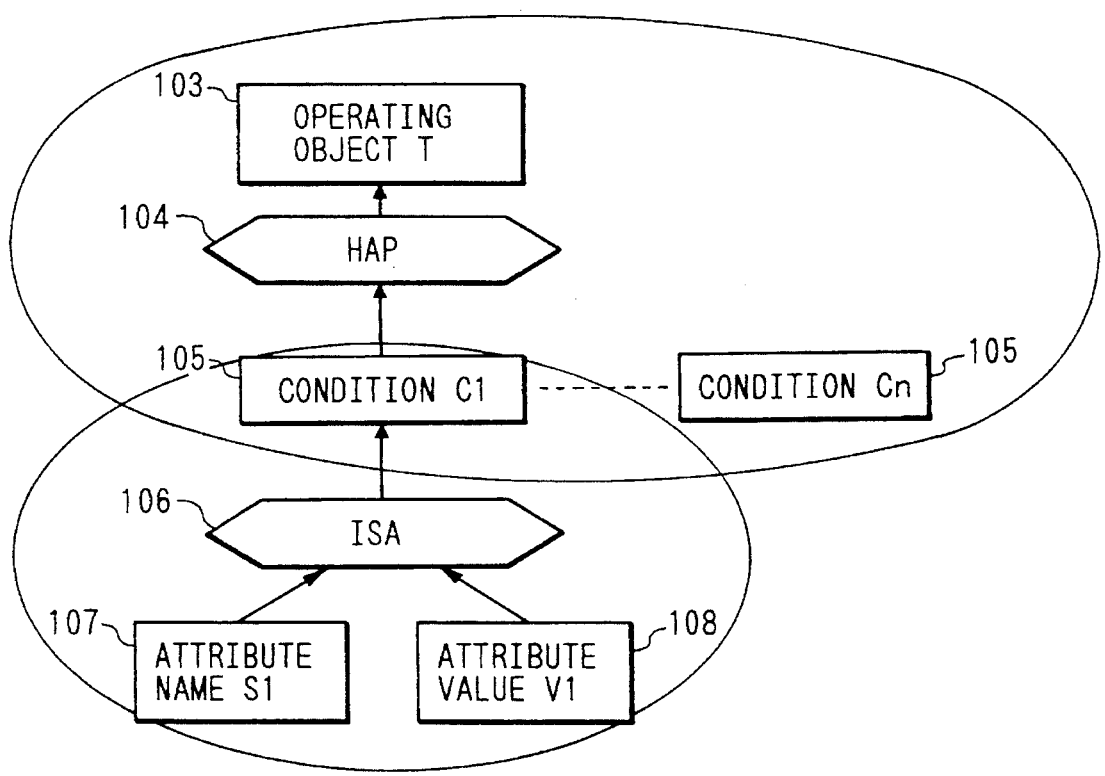
FIG. 3 is an illustration of the chained functions structure representing an object of operation and conditions.
Figure 5:
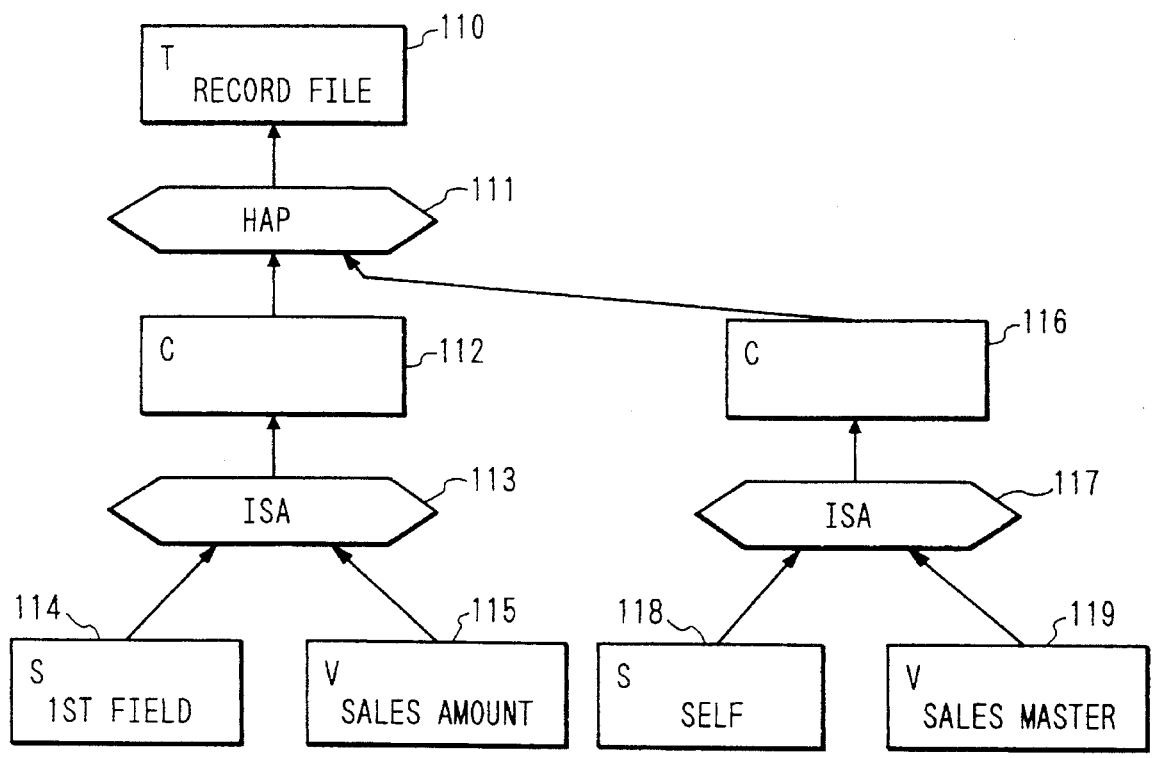
FIG. 5 is a drawing showing an actual example of "knowledge of the data base structure" of this embodiment.
Figure 7:
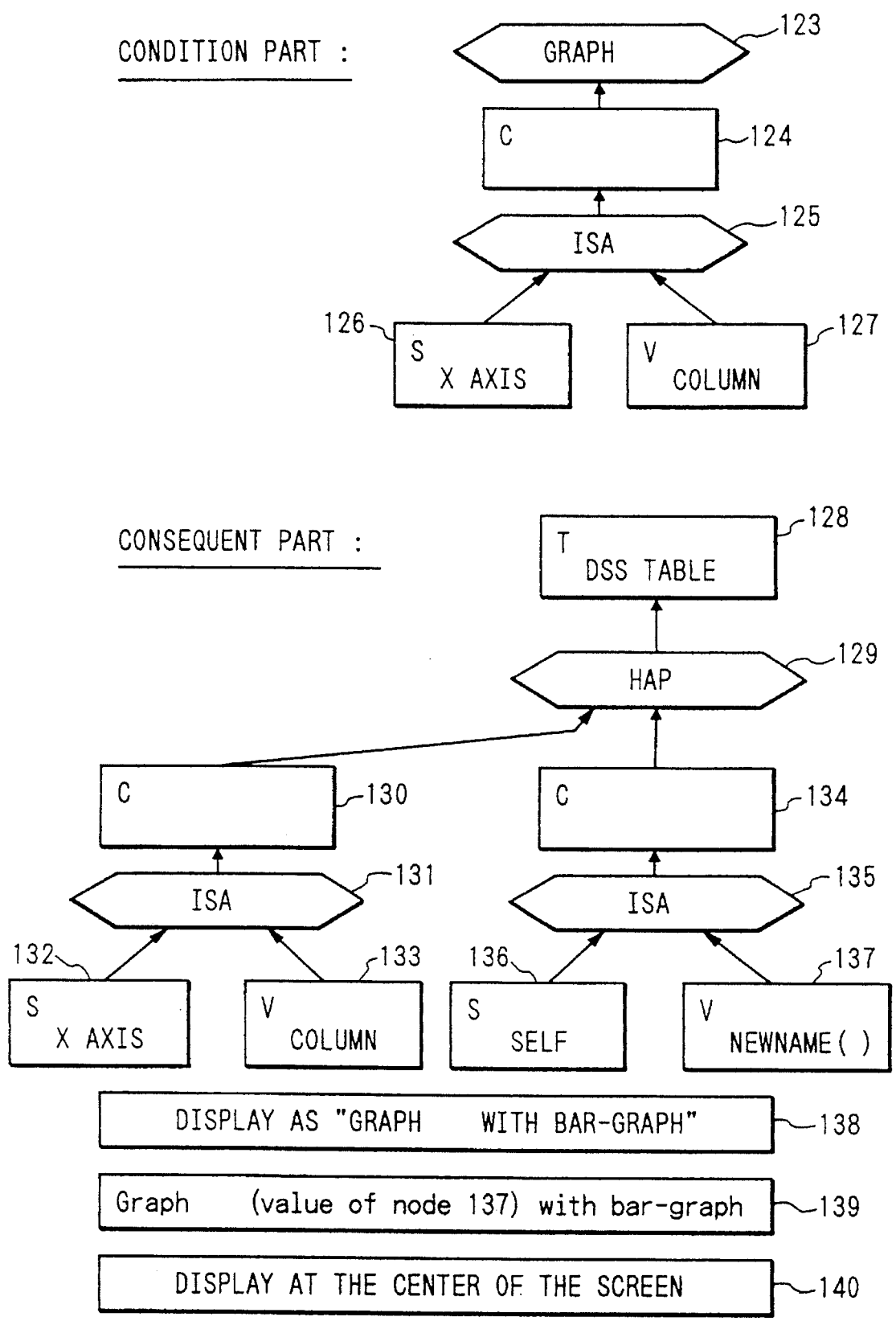
FIG. 7 is a drawing showing an actual example of the "meaning structure changing rule" of this embodiment.

Next, a semantic analysis 4 is made using knowledge (knowledge, see FIG. 5, which is described in a plurality of chained functions structures, see FIGS. 2 and 3, and a plurality of meaning structure changing rules, see FIG. 7)

from a knowledge data base memory 11. On the basis of the extracted concept of element of natural language, a new chained functions structure is generated. Although an actual example of the knowledge 11 will be described later, knowledge depending on the field, system, command language, and discourse is described in the chained functions structure respectively. Also the chained functions structure will be described later. Details of Step 4 will be described later furthermore with reference to FIGS., 9 and 10.

Next, a command language or a new character string or word phrase in natural language is generated 5 on the basis of information of the knowledge which is necessary for generation of a new chained functions structure (particularly knowledge of the meaning structure changing rule from the chained functions structure to the command language). Details of Step 5 will be described later furthermore with reference to FIG. 11.

Whether a command language is generated at Step 5 or not is judged (Step 6). When a command language is generated, it is executed (Step 7). When no command language is generated (or the command language is lost at Step 7), the processing branches to Step 8.

Whether a new character string or word phrase in natural language is generated at Step 5 or not is judged (Step 8). When the new character string or word phrase is generated, the natural language is analyzed. The natural language analysis 9 may be the same as the natural language analysis 2. If this occurs, the processing branches to a step of the natural language analysis 9 (equivalent to Step 3 of the natural language analysis 2) which is called recursively. However, when calling the natural language analysis recursively, it is necessary to store the information (a variable value, etc.) of the processing which is performed before that point of time so that it can be returned as required when the processing to be called is terminated and the processing is returned to the processing for calling. Explanation of a recursive call mechanism (for example, a mechanism for saving and managing the variable value temporarily using a stack, etc.) will be omitted because it can be realized by using the well-known technique.

When there is no new character string or word phrase in natural language available which is to be processed at Step 5 (or the character string or word phrase in the natural language is lost at step 9), the natural language analysis 2 is terminated. Or, when this natural language processing 2 is recursively called, the processing goes to Step 6 of the natural language analysis which is the calling source.

When the natural language text from the user is inputted repeatedly, the aforementioned series of processing is repeated in correspondence to each input.

The dictionary 10 is a table having at least information (representation, inflection, etc.) referring to the morphological information, information (modifying, case, etc.) referring to the syntactic information, and information (weight of the information about function, weight of the information about operating objects, weight of the information about condition, weight of the information about attribute name, weight of the information about attribute value, function name, label of concept, etc.) referring to the semantic information for each morpheme or structural element of the natural language corresponding to it. Since the dictionary is not the subject of the present invention, detailed explanation thereof will be omitted.

Concrete explanation of the dictionary is indicated in the specification of Japanese Patent Application Laid-Open No. 2-228126 which was applied previously.

The knowledge 11 is a table for storing knowledge for analyzing the meaning of a natural language text and generating a command. Hereinafter, a chained functions structure having a one-to-one correspondence with knowledge stored in the table is used for representation for reasons of explanation. The knowledge 11 stores at least the following types of knowledge.

(1) Knowledge depending on the domain, for example, knowledge depending on the dedicated knowledge in each of the domains of retail trade, medical treatment, education, personnel affairs, finance, etc. The knowledge includes the structure of a data base which is used in the relevant domain. In this case, description of the dedicated knowledge in the relevant domain can be modeled for computations on the basis of the prior art such as a hierarchical-tree structure model (changed slightly).

(2) Knowledge of the system, that is, knowledge of the broader and narrower relationship of concepts which are used in the system, etc.

(3) Knowledge of applications, that is, knowledge of the correspondence between functional contents of a natural language text and the format of a command.

(4) Knowledge depending on a discourse, that is, knowledge of screen information and history information. Representation of these types of knowledge by a concrete chained functions structure will be described later.

FIG. 2 is an illustration of the basic structure of the chained functions structure. A basic structure of a chained functions structure is a network structure in which a concept is represented as a node and the relationship between the concepts is represented as a link (branch). And a chained functions structure generally has a combined structure of at least one of such basic structures. The unit of concept is almost equivalent to a semantic conclusion of elements of natural language (a headword or subheading of a dictionary). According to the basic structure of the chained functions structure shown in FIG. 2, child nodes 101 of a node 100 indicating a function are nodes (input 1 to input n) of input data or conditions to the function 100 and parent nodes 102 of the node 100 indicating the function is nodes (output 1 to output m) of output data and conditions from the function.

In the drawing, the nodes are represented by quadrilaterals (nodes of input data and conditions) and a hexagon (a node indicating the function) and the relationship between the nodes is represented by connecting with directed links from the child nodes to the parent nodes. Hereinafter, a kind of node indicating a function which particularly indicates an operation instruction function may be referred to as a functional node.

When representing that an output result of a function A is input data or condition of another function B, it is represented by assuming the node of the output result of the function A as a node of the input data or condition of the function B.

To represent the chained functions structure, a graph structure such as a tree structure or a semantic network structure may be used.

For reasons of processing, a root node or a node for modifying and limiting a node may be provided in an actual chained functions structure.

Each node has the following information; that is, (1) a node ID (identifier) for identifying the node, (2) information of a link with another node, and (3) an attribute indicating the application of the node itself.

Furthermore, each node may have the following information; that is, (4) information of natural language representation, (5) information of additional words, (6) information of function names or information of labels of concept which are meant by those types of information (data), (7) information of the representation position of a given natural language text, (8) information of the range accompanying those types of information (data), and (9) information of case relations in corresponding natural language texts of those types of information (data).

Furthermore, when a node is a structural element of the chained functions structure of the knowledge 11, it may have the following information; that is, (10) the ID of the chained functions structure to which the node belongs from the beginning, (11) the type ("meaning structure changing rule", "instantiation data", etc ) of the chained functions structure in (10), and (12) importance of the linkage of the node (to reduce the total amount to be defined by utilizing the meaning structure changing rule, the distinction of "optional" or "obligatory" is defined, so that this is not information which is essentially necessary).

On a computer, for example, memory areas 1 to 12 are allocated to each node and each information which is possessed by the node is stored in the corresponding memory area. Those types of information will be explained when necessary in the following actual examples.

By the attribute indicating the application shown in (3), nodes are divided into the following types. The first type is a system node, which is used to process (manage, deform, etc.) the chained functions structure. For example, for representing in a tree structure, there is a node ("root" is given as an attribute) for representing a root available.

The second type is a node indicating a function. In this case, "function" is given as an attribute. The node indicating a function is additionally subdivided into a functional node and a node other than the functional node.

The functional node is a node for representing a function for instructing an application. A method (command, etc.) for instructing an actual application is described in the consequent part of the changing meaning structure changing rule which is defined in correspondence to this functional node.

Nodes indicating a function other than the functional nodes are nodes for representing the semantic relationship between the nodes of data and output, which will be described later.

For example, they are a node for representing the semantic relationship of broader and narrower concepts ("ISA" is given as a function name), a node for representing the relationship between an object and the attribute thereof ("HAP" is given as a function name), and a node for representing the semantic relationship of equivalence ("EQU" is given as a function name).

The third type is operating object/condition nodes, which are nodes for representing input data or output results which are operating objects or conditions for nodes indicating a function. For example, they are a node for representing an operating object ("operating object" is given as an attribute), a node for representing the condition itself ("condition" is given as an attribute), a node for representing the attribute name which is a structural element of the condition ("attribute name" is given as an attribute), and a node for representing the attribute value which is a structural element of the condition ("attribute value" is given as an attribute).

FIG. 3 is an illustration of the chained functions structure representing an object of operation and conditions.

To allow the natural language representation to represent a condition of "S is a V" in a chained functions structure, "ISA" (although this is derived from "is a", strictly speaking, it is not of the same concept and representation of "ISA" is used) is assumed as a node 106 indicating a function, and an "attribute name S" node 107 and an "attribute value V" node 108 are combined as child nodes of the node 106, and "condition C" nodes 105 are combined as parent nodes of the node 106. Each "condition C" node is a node which represents that "S is a V" in the above example.

For example, when the natural language representation is a condition of "The graph type is a bar-graph" the chained functions structure is a structure that the node 106 "ISA" indicating the function, the node 107 "graph type" indicating the attribute name, and the node 108 indicating the attribute value connect "bar-graph" and the nodes 105 indicating the conditions respectively as shown by the above explanation.

When representation in which the attribute name S is omitted such that the natural language representation "is a V" is to be represented in a chained functions structure, the node 107 indicating the attribute name S may be connected as a dummy node or may be omitted. In this case, "is a bar-graph" or "red" is used as an actual example of natural language representation.

When an operating object is to be represented in a chained functions structure, the operating object is represented by a combination of conditions representing the attribute of the operating object. Namely, to represent the operating object in a chained functions structure, "HAP" (although this is derived from "have a property", strictly speaking, it is not of the same concept and representation of "HAP" is used) is assumed as a node 104, and the "condition C" nodes 105 are connected as child nodes of the node 104, and an "operating object T" node 103 is connected as a parent node of the node 104.

For example, an operating object that the natural language representation is "The graph type is a bar-graph" will be considered. In other words, an operating object in which the graph type is a bar-graph is represented in a chained functions structure. According to this structure, the node "HAP" indicating the function and the node 103 indicating the operating object are connected as explained above in addition to the chained functions structure consisting of the nodes 105 to 108 as explained in the above example.

Each operating object generally has a plurality of conditions (attributes). When representing it in a chained functions structure, the nodes 105 indicating conditions thereof are connected as child nodes of the node 104 indicating the function.

"The graph type is a bar-graph and the Y axis indicates sales amount" is an actual example of natural language representation in such a case. However, it is assumed that an operating object is shown by this statement. In this case, according to the chained functions structure, the node "ISA" indicating the function, the node "graph type" indicating the attribute name, the node "bar-graph" indicating the attribute value, and the nodes indicating the conditions are connected and also the node "ISA" indicating the function, the node "Y axis" indicating the attribute name, the node "sales amount" indicating the attribute value, and the nodes indicating the conditions are connected and furthermore the two types of nodes indicating the conditions, the node "HAP" indicating the function, and the node "operating object" indicating the operating object are connected.

By doing this, the operating object and conditions are represented in the same format of chained functions structure, so that the chained functions structure of the operating object can be described including the chained functions structure of the conditions as mentioned above.

Therefore, it is possible from a viewpoint of representation to interpret an expression of a condition in natural language as an anaphoric expression of an operating object including the condition.

For example, it is possible from a viewpoint of representation to interpret a condition of "red" as an anaphoric expression of an operating object including the condition (for example, a bar-graph of sales amount in June which is displayed in red). As mentioned above, the chained functions structure on the basis of the above explanation is meaning representation which is effective in interpretation of anaphora of condition representation which refers to an operating object.

Figure 4:
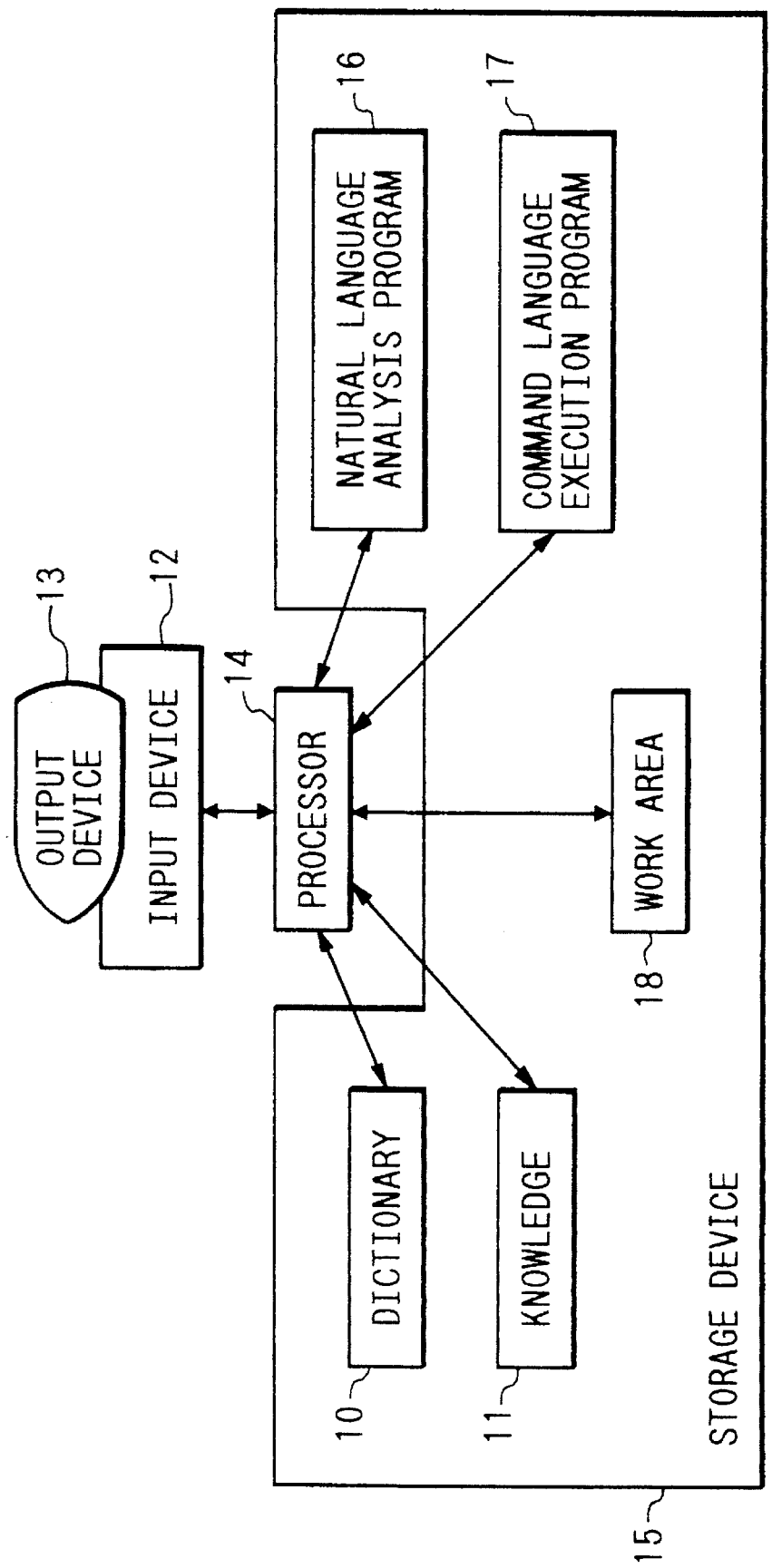
FIG. 4 is a block diagram of the hardware of this embodiment.

FIG. 4 is a block diagram of the hardware of this embodiment. The hardware consists of a processor 14, a storage device 15 which is connected to the processor, an input device 12, and an output device 13. In the storage device 15, a natural language analysis program 16, a command language execution program 17, a work area 18, a dictionary 10, and knowledge 11 are stored. As shown by FIG., 4 and the above brief explanation, the hardware for executing the present invention may be a computer system. It may be a large scale computer as well as a computer which is called a workstation or a personal computer. The processor 14 just executes the natural language analysis program 16 and the command language execution program 17 and operates as a syntax analysis means, semantic analysis means, or meaning structure changing means together with these programs. The storage device 15 just stores the dictionary 10 and the knowledge 11 and so on, and just reserves the work area 18. The structure of the hardware may be a computer structure of a distributed system in which independent computers are mounted and connected for the execution and storage mentioned above.

The computers may be connected to each other functionally via a storage medium. However, it is not desirable from a viewpoint of the property of the present invention.

The natural language analysis program 16 is a program for executing a series of processing starting at Step 1 shown in FIG. 1. A program for executing the processing at Steps 1, 3, 4, 5, 6, and 8 and a program for executing the processing at Step 2 may be stored in the computer as different programs. However, it is desirable from a viewpoint of the property of the present invention that these programs are commonly used and recursively called. At Step 7, the processing corresponding to the command language may be executed. However, the processing for giving (starting) a chance of execution to a process (task or program) which is to be actually executed may be executed from a viewpoint of the program structure (from a viewpoint of development efficiency or execution efficiency). Step 7 of the natural language analysis program 16 means the start of execution but does not always mean the end of it.

The command language execution program 17 is a program for executing the actual command language or for continuing the execution (Step 7). A software structure that each processing corresponding to a plurality of command languages is executed by each process using a multi-process (multi-tasking) may be used.

FIGS. 5 to 8 are actual examples of the knowledge 11 of this embodiment.

To generate commands by analyzing the meaning of a natural language text, the following types of knowledge are necessary.

(1) Knowledge of the vocabulary and grammar (for example, a dictionary)

(2) Knowledge depending on the domain (for example, knowledge of retail trade and medical treatment and knowledge on the basis of the data base structure for representing the above knowledge)

(3) Knowledge of the system (knowledge of the broader and narrower relationship in the system)

(4) Knowledge of applications (knowledge of the correspondence of command contents of a natural language text and command format (hereinafter may be called particularly a meaning structure changing rule) etc.)

(5) Knowledge depending on a discourse (screen information, I/O history, operation history, etc.)

Actual examples that the knowledges in (2) to (5) are represented in the aforementioned chained functions structure will be explained. It is also possible to represent the knowledge of the vocabulary and grammar in (1) using the chained functions structure, to incorporate it into the knowledge 11 as a representation format which is equivalent to that of the knowledges in (2) to (5), to integrate a series of analysis from a morphological analysis 3 to a semantic analysis 4, and to improve the natural language analysis precision furthermore by composition of knowledge. In this case, however, compared with the method of the conventional prior art which searches a dictionary as a simple table, the processing speed is slow, so that the above method is not desirable in practical use.

FIG. 5 shows an actual example of knowledge depending on the domain in Item (2) of this embodiment, particularly knowledge of the data base structure.

The knowledge that the first field of the sales master of the data base which is a record file is a sales amount field can represent the record file in a chained functions structure as an operating object.

Namely, the operating object is represented as an operating object "record file" 110 which has both a condition 112 that an attribute name "1st field" 114 is an attribute value "sales amount" 115 and a condition 116 that an attribute name "self" 118 is an attribute value "sales master" 119.

In this case, the relationship between the attribute name "1st field" 114, the attribute value "sales amount" 115, and the condition 112 is represented by a function "ISA" 113, and the relationship between the attribute name "self" 118, the attribute value "sales master" 119, and the condition 116 is represented by a function "ISA" 117, and the relationship between the condition 112, the condition 116, and the operating object "record file" 110 is represented by a function "HAP". By doing this, knowledge of the data base structure can be represented in a chained functions structure.

Figure 6:
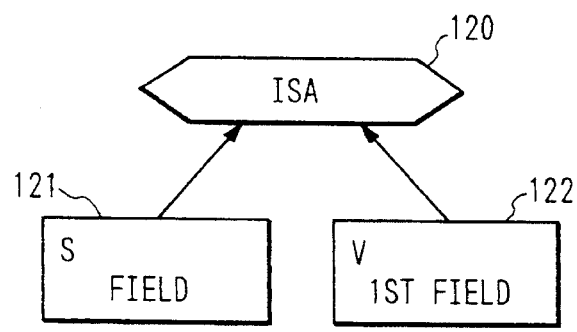
FIG. 6 is a drawing showing an actual example of "knowledge" of the broader and narrower relationship in the system of this embodiment.

FIG. 6 shows an actual example of knowledge of the system in Item (3) of this embodiment, particularly knowledge of the broader and narrower relationship in the system.

The knowledge of the broader and narrower relationship that the first field is a kind of field which is a structural element of the record file can be represented in a chained functions structure as a kind of condition.

Namely, this condition represents that an attribute name "field" 121 is an attribute value "1st field" 122. In this case, the relationship between the attribute name "field" 121 and the attribute value "1st field" 122 is represented by a function "ISA". By doing this, knowledge of the broader and narrower relationship in the system can be represented in a chained functions structure. Knowledge of a thesaurus of the vocabulary in Item (1) also can be represented in a chained functions structure.

According to this method, knowledge can be represented as a chained functions structure for each broader and narrower relationship, so that even if the thesaurus of vocabulary is not systematized, the partial broader and narrower relationship of the thesaurus can be incorporated into the knowledge 11 so as to utilize it in the natural language analysis 2.

FIG. 7 shows an actual example of knowledge of applications in Item (4) of this embodiment, particularly of the meaning structure changing rule.

The dedicated knowledge of the decision support system that when data is graphed by taking the specified column as an X axis, a DSS table is generated represents the condition part of the meaning structure changing rule which is "graphization" of the first half of the knowledge and the consequent part of the meaning structure changing rule which is "generation" of the latter half of the knowledge in a chained functions structure respectively.

Namely, it is represented that the condition part is a function "graphize" 123 for inputting a condition 124 that an attribute name "X axis" 126 is an attribute value "column" 127. In this case, the relationship between the attribute name "X axis" 126, the attribute value "column" 127, and the condition 124 is represented by a function "ISA".

The consequent part of the meaning changing rule structure is represented as an operating object "DSS table" having both a condition 130 that an attribute name "X axis" 132 is an attribute value "column" 133 and a condition 134 that an attribute name "self" 136 is an attribute value "NewName ()" 137.

In this case, the relationship between the attribute name "X axis" 132, the attribute value "column" 133, and the condition 130 is represented by a function "ISA" and the relationship between the attribute name "self" 136, the attribute value "NewName ()" 137, and the condition 134 is represented by a function "ISA" and the relationship between the condition 130, the condition 134, and the operating object "DSS table" is represented by a function "HAP".

However, Knowledge that the attribute value "column" 127 of the condition part and the attribute value "column" 133 of the consequent part are the same is also prepared in this meaning structure changing rule. It can be realized briefly by setting them as a same node or by indirectly referring to the attribute value 127 as a reference destination of the content of the attribute value 133.

"NewName ()" is a function for generating an identifier which is not found in the application system. When the node 137 is referred to, an identifier is newly given to the node and the node is replaced with the identifier. For network walk for search of the semantic analysis (Step 4), a node for connecting the condition part and consequent part may be prepared from a viewpoint of processing.

In addition, in the consequent part of the meaning structure changing rule, new different character strings in natural language, commands (or command templates) of the application system, and commands (or command templates) for updating the knowledge 11 are described. These character strings in natural language and commands are described in the processing order. Therefore, they may be described mixedly.

Detailed processing in this case will be described later.

Character strings in natural language and commands which are to be described in the consequent part of the meaning structure changing rule are, for example, a natural language text "Display as "graphize with bar-graph"" 138 for outputting a guidance message or help message, a command template "Graphize (value of node 137) with bar-graph" 139 for operating the application system (the decision support system in this case), and a natural language text "Display at the center of the screen" 140 for explaining a function which is to be added and executed furthermore.

By doing this, the meaning structure changing rule can be represented in a chained functions structure. "(value of node 137)" means a slot for indicating to substitute the value of the attribute value node 137 in Processing 5 for generating an execution command from the command template.

Figure 8:
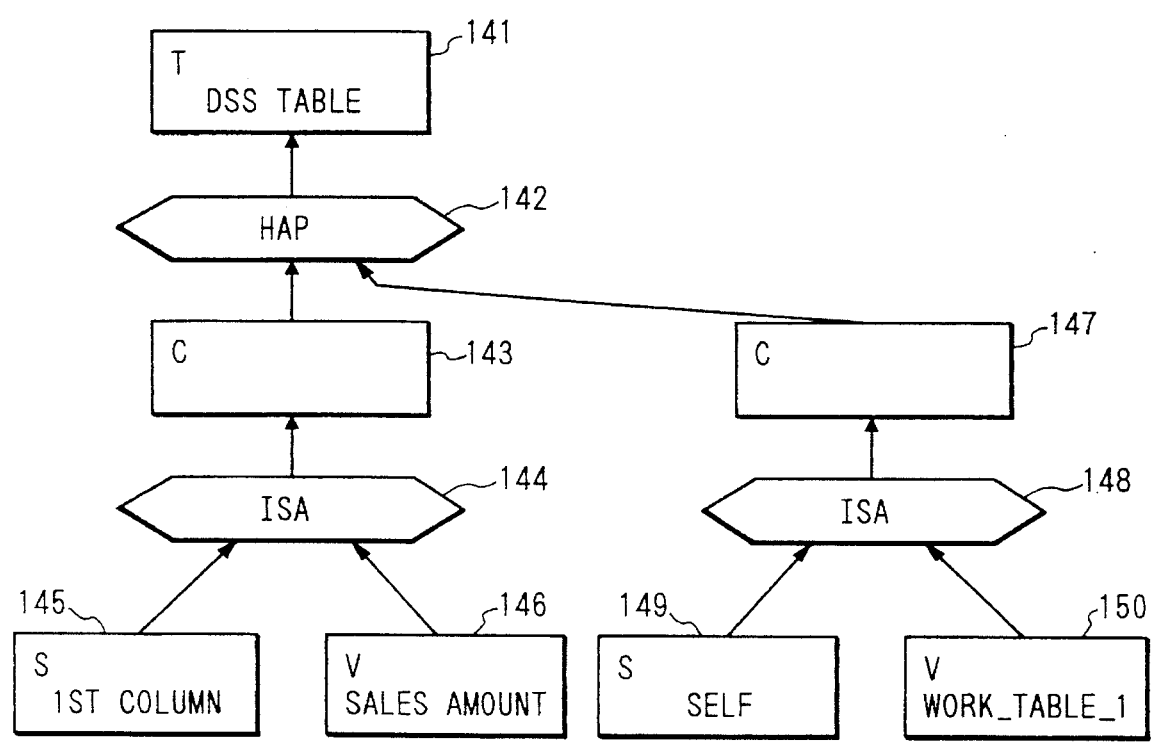
FIG. 8 is a drawing showing an actual example of "knowledge" of an operating object and the attribute thereof of this embodiment.

FIG. 8 shows an actual example of knowledge depending on a discourse in Item (5) of this embodiment, particularly knowledge (particularly may be called instantiation data hereunder) of an operating object which actually exists (or existed) and the attribute thereof such as screen information or history information.

The knowledge that the first column of a "work—table—1" which is a DSS table used by the decision support system is "sales amount" can be represented in a chained functions structure using the DSS table as an operating object.

Namely, the operating object is represented as an operating object "DSS table" 141 which has both a condition 143 that an attribute name "1st column" 145 is an attribute value "sales amount" 146 and a condition 147 that an attribute name "self" 149 is an attribute value "work—table—1" 150.

In this case, the relationship between the attribute name "1st column" 145, the attribute value "sales amount" 146, and the condition 143 is represented by a function "ISA" 144, and the relationship between the attribute name "self" 149, the attribute value "work—table—1" 150, and the condition 147 is represented by a function "ISA", and the relationship between the condition 143, the condition 147, and the operating object "DSS table" 141 is represented by a function "HAP" 142. By doing this, the instantiation data can be represented in a chained functions structure.

As mentioned above, by representing the knowledges in (2) to (5) in a chained functions structure which is the same representation format, a semantic analysis for suitably linking at least two types of knowledge can be made easily. Compared with a case of the prior art that the representation format of knowledge to be used (for example, a dictionary) is different from the intermediate meaning representation, the utilization of the chained functions structure as meaning representation of a natural language text like this embodiment is effective in use of the algorithm of semantic analysis or storage area.

Furthermore, knowledge editors can be integrated because various types of knowledge representation are the same representation format, so that the entire memory consumption can be reduced. Compared with a case that a plurality of different knowledge editors are provided, the operation method is standardized, so that the maintenance man-hour and development man-hour are reduced.

Figure 9:
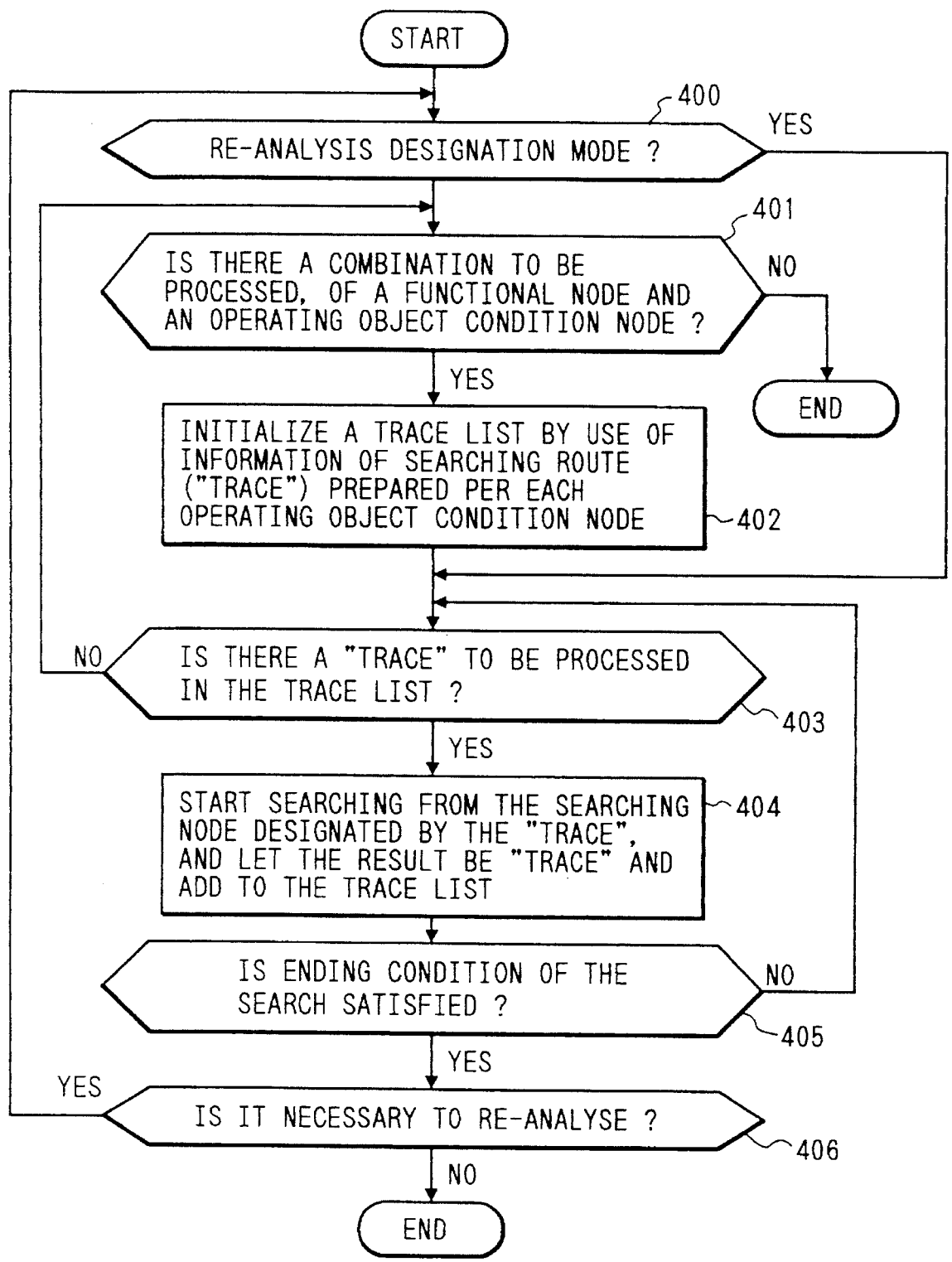
FIG. 9 is a detailed flow chart of semantic analysis (Step 4) of this embodiment.

FIG. 9 is a detailed flow chart of the processing procedure of semantic analysis (Step 4) of this embodiment. The knowledge of domain, system, application, or discourse which is already explained is represented in a chained functions structure which is a kind of semantic network.

The semantic analysis of this embodiment is a processing method that it searches various types of knowledge in this chained functions structure and the semantic network which is gotten as the search path is the intermediate meaning representation of the given character string in natural language.

Namely, the algorithm for this network walk for search is an algorithm that chained functions structures that an operating object or condition is a starting point and a function is an ending point are detected by searching chained functions structures which are various types of knowledge and a chained functions structure which gets constructed by combining those chained functions structures is intermediate meaning representation. The detailed processing procedure will be described below. According to the embodiment, the operating object or condition is a starting point and the function is an ending point. However, the starting point and ending point may be reversed or a combination of the starting point and ending point may be other than the above mentioned.

First, whether to obtain the first candidate of meaning by performing a semantic analysis of a character string in natural language or to obtain the second or subsequent candidates of meaning is selected (Step 400). To obtain the "n-1"th candidate of meaning, the intermediate results (trace list (described later), etc.) of analysis of up to the "n-1"th candidate are saved.

When obtaining the first candidate of meaning, the intermediate results (trace list, etc.) of analysis are initialized and the processing branches to Step 401.

When obtaining the second or subsequent candidates, the processing branches to Step 403.

According to this processing method, when the system executes an analysis which is not intended by a user who enters an input statement or the system attempts to indicate a plurality of analytical candidates to the user at the same time, the processing for obtaining the second or subsequent candidates of meaning can be realized efficiently.

Next, combinations of a functional node and an operating object condition node (generally a plurality of operating object condition nodes) which is related to the functional node syntactically or in expression position are detected among the nodes which are allocated for each element of natural language (almost equivalent to a phrase) in the processing of up to Step 3 shown in FIG. 1 (Step 401).

When there are combinations which are not analyzed at Steps 402 to 406 among the detected combinations, the processing branches to Step 402.

When such combinations are not found, the semantic analysis (Step 4) shown in FIG. 1 ends.

In the processing of Step 402 and the subsequent steps, for a combination obtained at Step 401, the functional node may be called a "search ending node" and the operating object condition node may be called a "search starting node".

When a suitable combination of nodes cannot be determined, the subsequent analysis may be executed by setting a predetermined default (or dummy) operating object condition node as a "search starting node" and a predetermined default (or dummy) functional node as a "search ending node" supplementarily.

Next, the trace list is made null and the trace which is prepared for each "search starting node" is added to the trace list (Step 402).

The "trace" is a structure of data for storing the search path and each trace is equivalent to storing of a step of the network walk. The "trace list" is a set of traces.

Each trace has the following information.

Trace information a: The trace a step before (when at least two traces are joined, a plurality of "traces a step before") is stored.

Trace information b: The node which is being searched at present

Trace information c: The distance of search path, which is a distance from the search starting node to the node of the trace information b The distance calculation method accumulates values which are weighted properly according to passed (or joined) nodes (or links).

For example, according to an algorithm that nodes or links are searched step by step in the ascending order of search path distances by weighting on the basis of use frequency and importance thereof, a suitable search path can be discovered in a priority basis. In an actual example which will be described later, the distance calculation method will be explained, for simplicity, using the total number of passed nodes or using the total of the distance of each branch when joined.

Trace information d: Evaluation points, which are a value obtained by adding the matching points of the trace with the search starting node to the evaluation points of the trace a step before Trace information e: A set of chained functions structures which can be searched at the next step, that is, a set of knowledge which can be used. As the set of chained functions structures increases or decreases according to a discourse, the subject is focused and the discourse can be tracked easily.

The main purpose for executing network walk for search using traces which are defined like this is to perform a search with high memory efficiency. For example, during network walk for search, usable knowledge may be generated or eliminated according to the search path. Therefore, it is necessary to copy the knowledge for each search path.

Generally, the search path branches or joins repeatedly. Therefore, the consumption of memory for copying each knowledge is enormous. By storing network walk for search as a "trace" step by step like the present invention, there is no need to use a memory for copying the search path which is used commonly before the search path branches, so that the efficiency is increased.

Next, when there is a "trace" to be processed found in the trace list, the processing branches to Step 404 or when such a trace is not found, the processing branches to Step 401 (Step 403). For example, nodes are fetched in the ascending order of search path distances (trace information c) in the trace list.

Next, network walk for search is executed starting from the node (trace information b) under trace search which is obtained at Step 403, and a node a step ahead is detected, and the trace of the node is added to the trace list (Step 404). Step 404 will be explained more in detail in FIG. 10.

Next, whether the search ending condition is satisfied or not is judged. When the condition is satisfied, the processing branches to Step 406 or when the condition is not satisfied, the processing branches to Step 403 (Step 405).

The search ending conditions are as follows:

(a) The distance of search path (trace information d) reaches a fixed value.

(b) There is a trace of a node which matches the functional node obtained by natural language analysis.

(c) There is a trace which has sufficiently high evaluation points (trace information d).

From one of the above conditions or a combination thereof, the search end is judged.

For example, nodes are searched until the search path distance reaches a predetermined value and when a trace having the highest evaluation points is detected among the traces of nodes which match the functional node obtained from the natural language text, the search ends. This trace is taken as a first candidate of meaning.

In the case of the second and subsequent candidates of meaning, traces having lower evaluation points are taken as candidates of meaning. When the number of trace candidates is required to increase so as to obtain the second and subsequent candidates of meaning, the search path distance of the search ending condition (a) may be extended dynamically.

Next, when the search ending condition is satisfied, whether the search result is suitable as a meaning of the input text or not is confirmed interactively with the user. When the search result is not suitable as a meaning of the input text, the re-analysis designation mode is set and the processing branches to Step 400. When the search result is suitable as a meaning of the input text, Step 4 ends.

For the above confirmation, furthermore for purpose of confirmation a natural language text which is generated on the basis of the chemical functions structure, the stack contents, and the chemical functions structure itself may be displayed additionally.

Step 406 for confirming the user may be set immediately before the execution of command language 7. When the search result is not suitable as a meaning of the input text also in this case, the re-analysis designation mode is set and the processing branches to Step 400. When the search result is suitable as a meaning of the input text, Step 7 starts. Step 406 may not be used. If this occurs, the user can perform a series of analysis and execution without the processing being interrupted. Therefore, it is suitable for batch processing.

Figure 10:
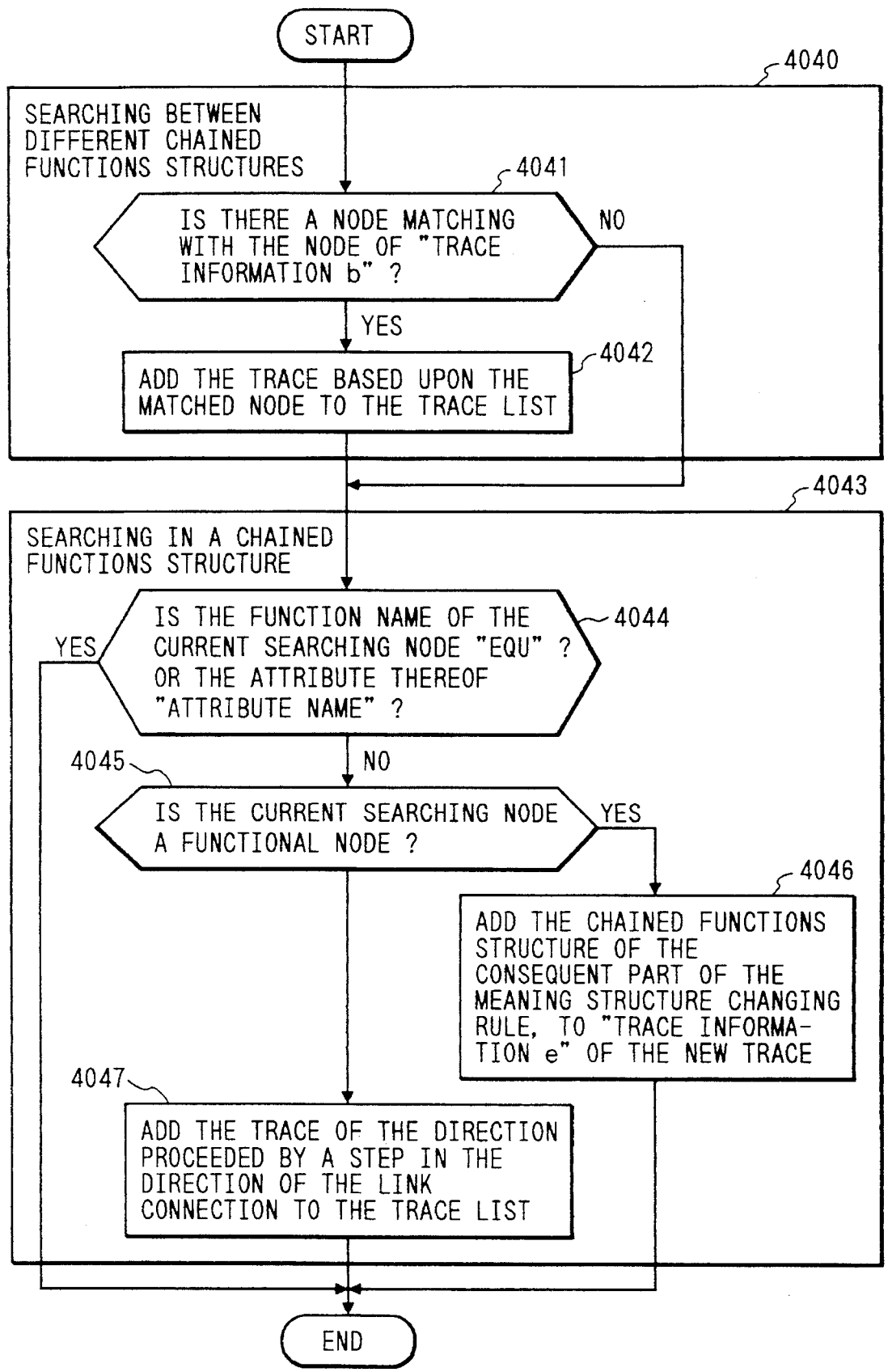
FIG. 10 is a detailed flow chart of network walk for search (Step 404) of this embodiment.

FIG. 10 is a detailed flow chart of network walk for search (Step 404) of this embodiment.

First, a network walk (search) to a chained functions structure which is different from the chained functions structure to which the trace information b of the trace obtained at Step 403 belongs originally is performed (Step 4040). Step 4040 consists of Steps 4041 and 4042 shown below.

Namely, when the node of the trace information b of the trace which is obtained at Step 403 is an operating object condition node, whether a node which is a structural element of the set of chained functions structures of the trace information e or the node of the trace information b of the trace which is obtained at Step 403 or not is judged (Step 4041). When the nodes match with each other, a new trace is generated on the basis of the node and added to the trace list (Step 4042). In this case, to structurally indicate to connect the matching source node and matching destination node, a node whose function name is "EQU" may be inserted between the nodes.

When there are no matched nodes found at Step 4041, the processing branches to Step 4043.

Next, a network walk for search is performed in the chained functions structure to which the trace information b of the trace obtained at Step 403 belongs originally (Step 4043). Step 4043 consists of Steps 4044 to 4047 shown below.

The processing varies with the attribute or function name of the search information b. Namely, when a node has a function name of "EQU" or a node has an attribute of "attribute name" (Step 4044), the processing immediately goes to Step 405.

When the current searching node is a functional node at Step 4045, the processing branches to Step 4046.

Next, the chained functions structure of the consequent part of the meaning structure changing rule is added to or deleted from the trace information e at Step 4046.

In the case of addition, new traces which are generated on the basis of only nodes among the nodes constituting the chained functions structure of the consequent part which are defined as nodes to be continuously searched beforehand are added to the trace list.

According to this embodiment, new traces which are generated on the basis of particularly only attribute value nodes contained in the chained functions structure are added to the trace list. A node for structurally clarifying continuation of this search may be inserted between the functional node and the node which is searched continuously. Thereafter, the processing goes to Step 405.

When the current searching node is a node other than a functional node at Step 4045, the processing branches to Step 4047.

Next at Step 4047, new trace which is generated on the basis of the node of the direction proceeded by a step in the direction of the link connection is added to the trace list. A trace having a returning search path is not desirable for the processing efficiency, so that it is not added to the trace list. Thereafter, the processing goes to Step 405.

The direction of link connection is as shown below.

The direction from the "HAP" node to the operating object node

The direction from the "ISA" node to the condition node or the attribute name node The direction from the attribute name node or the attribute value node to the "ISA" node or the "EQU" node The direction from the condition node to the "HAP" node or the functional node The direction from the operating object node to the functional node When generating a new trace at Step 4042, 4046, or 4047, the trace information a is a pointer of the previous trace, and the trace information c is the total of suitable positive values (addition of "1" briefly), and the trace information d is the total of the matching points between this node and the starting node and the evaluation points of the previous trace, and each trace information is calculated so as to generate a new trace.

The matching points are calculated on the basis of a match, similarity, or unmatch between the informations of two nodes. For example, when natural language expressions, attributes, and additional words are the same respectively between the informations of two nodes, "1" is added or when they are not the same, "0" is added and the total is taken as matching points.

When there are a plurality of search starting nodes or a branch is generated during search, there may be a trace equivalent to a search path which joins during network walk for search. When the two branches satisfy the condition necessary for joining, the joining search path is added to the trace list as a trace.

When at two traces which are subjected to network walk for search already match as child nodes of the same node of the chained functions structure containing the traces (having positive values in the above example), it is assumed that the aforementioned condition satisfies the joining condition.

Figure 11:
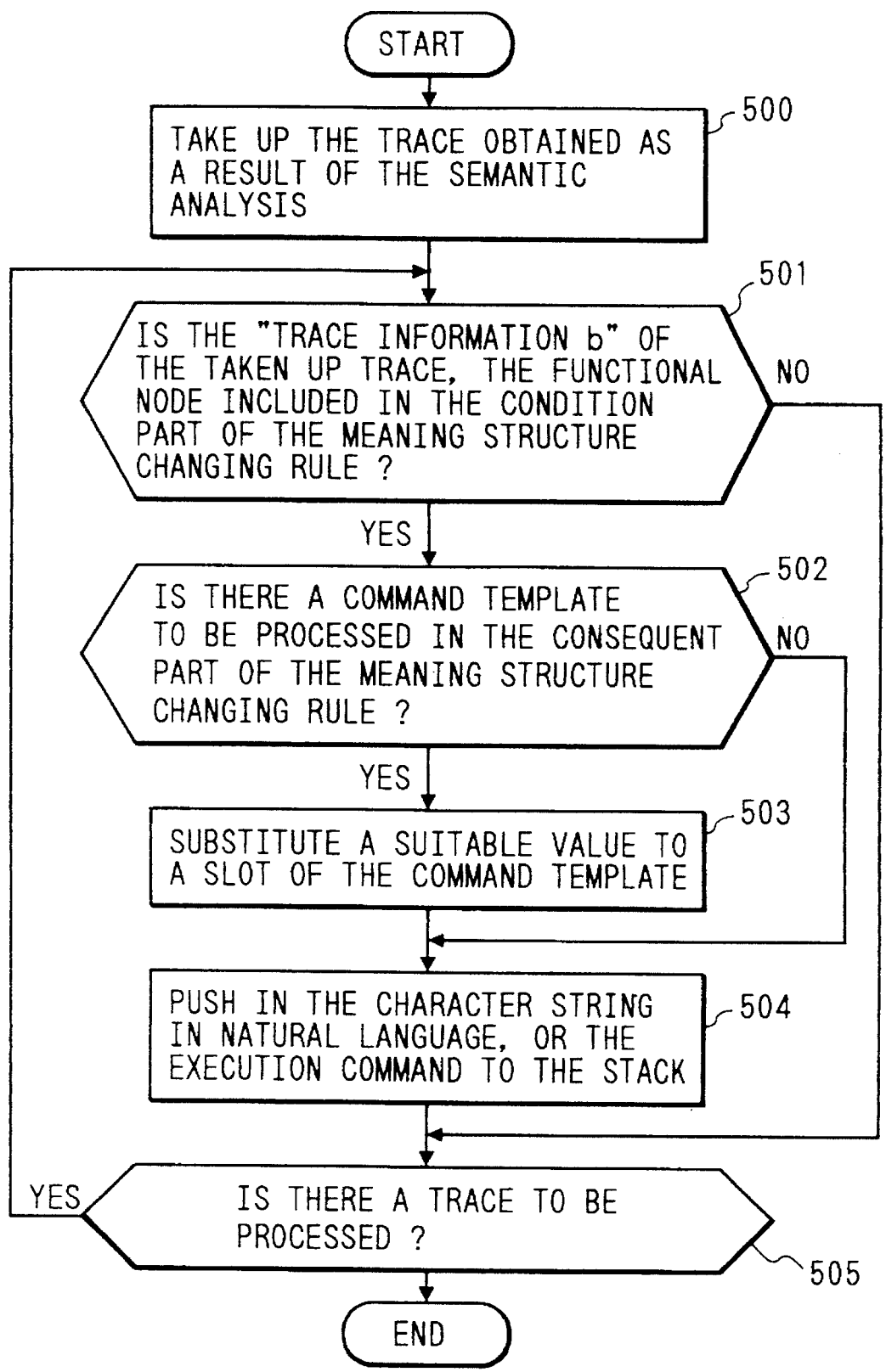
FIG. 11 is a detailed flow chart of changing the "meaning structure" (Step 5) of this embodiment.

FIG. 11 is a detailed flow chart of changing the meaning structure (Step 5) of this embodiment shown in FIG. 1.

First, the trace which is obtained by the semantic analysis (Step 4) shown in FIG. 1 is taken up (Step 500).

Next, when the trace information b of the trace which is taken up at Step 500 is originally the functional node contained in the chained functions structure of the condition part of the meaning structure changing rule, the processing branches to Step 502 or when it is not, the processing branches to Step 505 (Step 501).

Next, when a command template for operating the application system exists in the consequent part of the meaning structure changing rule which is obtained indirectly at Step 501, the processing branches to Step 503 so as to convert the command template to an execution command (Step 502). The information (the execution command, a new different character string in natural language, etc.) other than the command template which is described in the consequent part of the meaning structure changing rule is left unchanged.

Next, a suitable concrete value is substituted to a slot of the command template which is obtained at Step 502 so as to convert to an execution command which can be executed by the application software. To obtain a concrete value, a value may be processed and substituted to a suitable value with reference to the chained functions structure in the knowledge 11 containing traces on the search path.

Instead of performing conversion to the execution command from the command template at Step 503, it is possible to push in the command template to the stack in the same way as a command and to convert it immediately before the command language execution (Step 7) starts.

As to the conversion, it is desirable from a viewpoint of reuse of the knowledge 11 to copy only the consequent part of the meaning structure changing rule into the work area and to process the command template which is taken up instead of directly rewriting the meaning structure changing rule in the knowledge 11.

Next, the execution command which is obtained by the above processing and a new different character string in natural language are pushed in to the stack in the processing order (Step 504). Generally, they are defined in the consequent part of the meaning structure changing rule in the processing order. Therefore, they are pushed in to the stack just in the appearance order at Step 504.

Next, the trace a step before (trace information a) of the taken-up trace is referred to and assumed as a trace to be newly taken up and the processing branches to Step 501 (Step 505).

By repeating reference to the trace a step before (trace a step before) one by one like this, Steps 501 to 505 mentioned above are executed for all the nodes on the search path from the search ending node to the search starting node. When the nodes to be taken up are exhausted, Step 5 ends.

Next, the processing contents of this embodiment will be explained in detail on the basis of more concrete data with reference to FIGS. 1 and 5 to 17.

The application of this embodiment, that is, the decision support system is a system which executes the data base searching function, graph preparing, processing, displaying, and erasing function, data totalizing and printing function, and screen display information furnishing function on the basis of an instruction of a user. According to this embodiment, "intensive decision making" in Japanese is handled as a synonym of "decision making" in Japanese.

First, a natural language text "Sum up the sales amount and print the result" 220 is inputted by the input device 12 (Step 1 shown in FIG. 1).

Next, the natural language text which is inputted at Step 1 is subjected to a natural language analysis (Step 2).

The processing at Step 2 is as shown below. Firstly, the inputted natural language text is subjected to a morphological analysis (splitting into elements of natural language which can be handled equally to a morpheme or processing morpheme) and to a disambiguation (the meaning range is limited by using syntactic characteristics such as the subject-predicate relation and modifying relation, characteristics of the cooccurrence usage, and characteristics of the expression position and idiom) using the dictionary 10 (Step 3).

Figure 14:
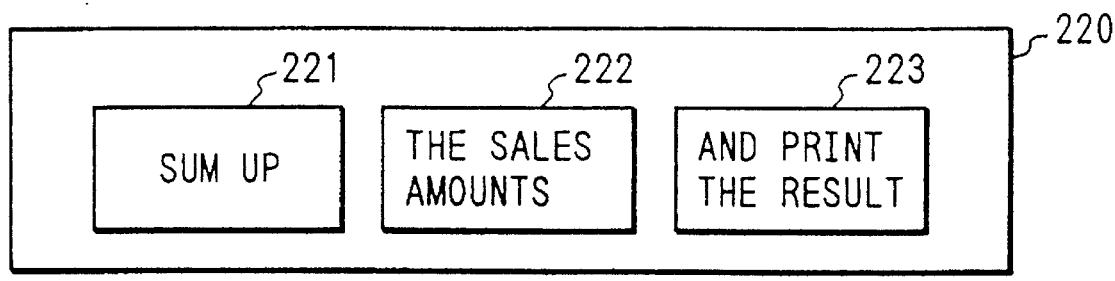
FIG. 14 is a drawing showing an example that a natural language text of "Sum up the sales amounts and print the result" is split or parsed into nodes in phrase units.

In the above example, phrases of "sum up", "the sales amount" and "and print the result" are recognized as a node 221, node 222, and node 223 are allocated for them respectively as shown in FIG. 14. The information of the dictionary shows that "the sales amount" is an operating object condition node and "sum up" and "and print the result" are functional nodes.

As shown by the later explanation, there is no need to analyze up to the text end at a time at Step 3. Namely, by only analyzing a fragment of the text "sum up the sales amount" which is obtained by removing the part of "and print the result" from the input text, the subsequent processing can be continued. This means that even when an input text includes an unknown word or is not correct grammatically, the present invention can be used for it.

Next, the semantic analysis shown in FIG. 1 is executed using the knowledge 11 (Step 4).

The semantic analysis is to structurally elucidate the meaning of a natural language text and is equivalent to construct the meaning representation conceptually. Therefore, the meaning representation may not be incarnate or descriptive and needless to say, it may not be outputted.

In this example, this meaning representation is assumed to be represented in a chained functions structure for simple explanation, which will be described later in detail.

Particularly, it is a structure of combined chained functions structures which are representations of the knowledge 11. Since the representation of knowledge to be used and the constructed meaning representation have the same format, there is no need to take the meaning representation method into account and the semantic analysis can be executed at high speed.

The semantic analysis (Step 4) will be explained more in detail.

Figure 12:
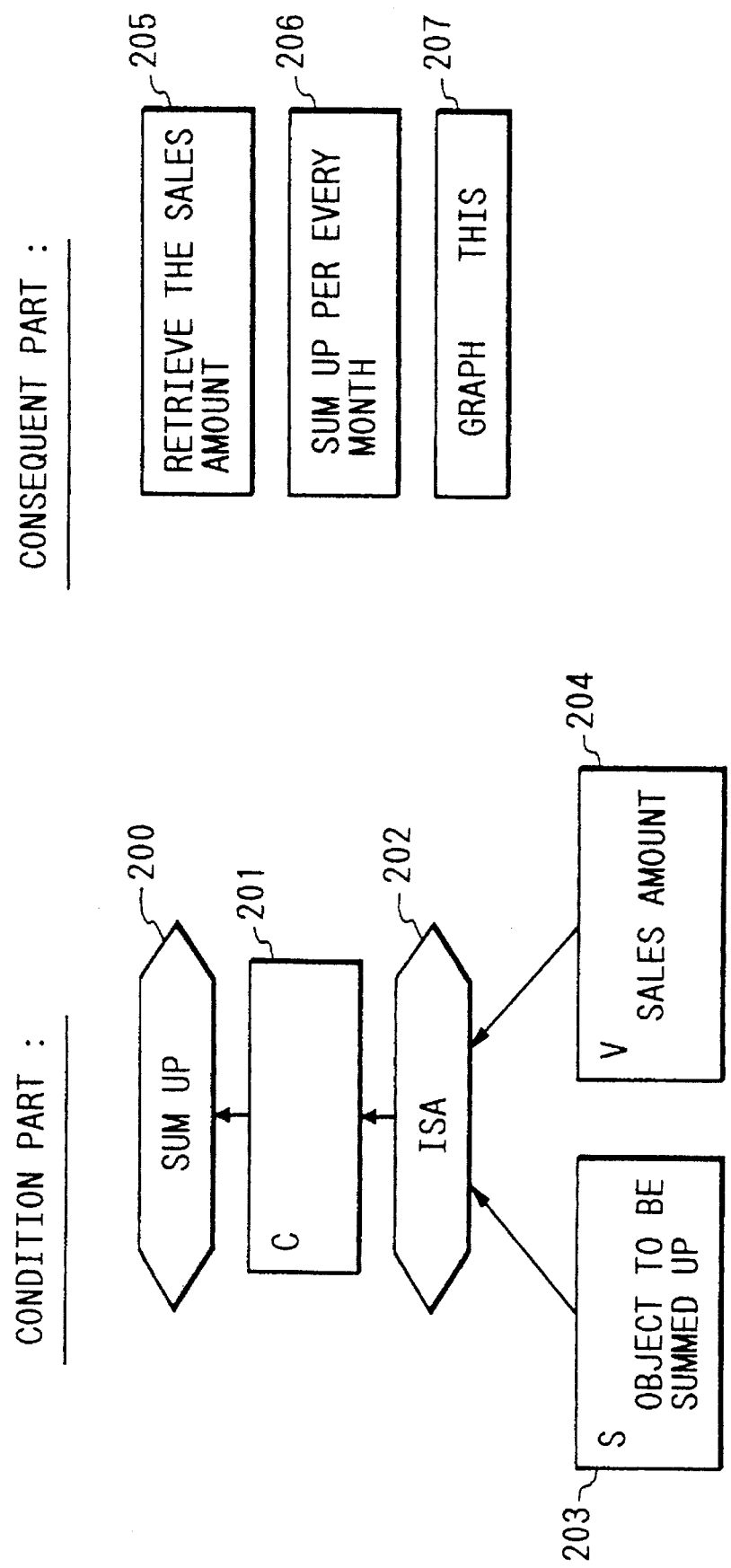
FIG. 12 is a drawing showing an actual example of the "meaning structure changing rule" which defines "Sum up the sales amounts".

FIG. 12 shows an actual example of the meaning structure changing rule which is to be defined in the knowledge 11 beforehand. Namely, the condition part of this meaning structure changing rule defines a chained functions structure which is equivalent to the meaning of "sum up the sales amounts".

Namely, it is represented the condition part is a function "sum up" 200 for inputting a condition 201 that an attribute name "object to be summed up" 203 is an attribute value "sales amount" 204.

In this case, the relationship between the attribute name "object to be summed up" 203, the attribute value "sales amount" 204, and the condition 201 is represented by a function "ISA". In the consequent part of this meaning structure changing rule, three new different character strings in natural language are defined. They are "Retrieve the sales amount" 205, "Sum up per every month" 206, and "Graphize this" 207.

First at Step 400 shown in FIG. 9, since the processing is the first analysis of the character string in natural language, the trace list is made null and the processing branches to Step 401.

Next, at Step 401, a combination of a functional node and operating object condition node which are to be processed is determined on the basis of the three nodes ("the sales amount", "sum up", and "and print the result") which are obtained up to Step 3. A combination of the operating object condition node "the sales amount" and functional node "sum up" is detected from the syntactic relationship.

In the subsequent processing, "the sales amount" is handled as a search starting node and "sum up" as a search ending node. Since "and print the result" is not used, it is pushed in to the stack until the first half of the text is analyzed.

Next at Step 402, a trace is constructed for the search starting node "the sales amount". Since a trace (trace information a) a step before this trace does not exist, it is made null. The current searching node (trace information b) is assumed as the node "the sales amount" 222.

As actual processing, the node ID of the node "the sales amount" 222 or the pointer of the storage area is stored for the trace information b.

"0" is given to the distance of search path (trace information c) and evaluation points (trace information d).

A chained functions structure which is equivalent to the knowledge of the knowledge 11 which can be used at present is given to a set of chained functions structures which can be searched at the next step (trace information e). In this explanation, at least the chained functions structure of the condition part of the meaning structure changing rule shown in FIG. 12 is assumed to be given. The trace which is obtained like this is added to the trace list.

As shown by the above explanation, the nodes, traces, and trace list can be handled in a table (arrangement) format.

Corresponding these data formats is a well-known technique for those who are skilled in the art in the field of the present invention, so that detailed explanation will be unnecessary.

Next, to process unprocessed traces in the trace list at Step 403, the processing branches to Step 404. Next, Step 404 will be explained more in detail.

First at Step 4041 shown in FIG. 10, nodes which match with the node 221 are detected from the nodes (nodes 200 to 204) contained in the trace information e. In this case, the independent words of natural language expression of the node "the sales amount" 222 match with those of the node "the sales amount" 204. At this time, addition of "1" to the evaluation points of a new trace which is to be constructed at Step 4042 is stored in the work area.

Next at Step 4042, a trace on the basis of the node 204 which is judged to match at Step 4041 is constructed. To connect the two nodes actually, a function "EQU" node 224 is inserted between the nodes 222 and 204.

First, a trace for the function "EQU" node 224 is constructed. Assuming that the trace information a is the node 222, and the trace information b is the node 224, and the trace information c is "1" (this is a value which is obtained by adding "1" to the trace information c of the node 222), and the trace information d is "0", and the trace information e is data which is the same as that of the trace information e of the node 222, the above trace is added to the trace list.

Next, a trace for the node "sales amount" 204 is constructed. Assuming that the trace information a is the node 224, and the trace information b is the node 204, and the trace information c is "2" (this is a value which is obtained by adding "1" to the trace information c of the node 224), and the trace information d is "1" (this is a value which is obtained at Step 4041), and the trace information e is data which is the same as that of the node 224, the above trace is added to the trace list.

Next, since the node 222 is not originally the chained functions structure in the knowledge 11 at Step 4044, Step 404 ends.

Next at Step 405, whether the current status of the trace list satisfies the search ending condition or not is judged.

For simplicity in this example, a condition that a node for ending the search (or a node which matches with the relevant node) exists in the trace information b of a trace in the trace list is assumed as a search ending condition. Therefore, the trace list at this time does not satisfy the search ending condition, so that the processing branches to Step 403.

Next at Step 403, the trace to be processed is determined to be a trace having a smallest searching distance among the unprocessed traces in the trace list.

Namely, it is a trace corresponding to the node 224. Step 404 is executed for this trace. Step 4041 results in NO and Step 4044 results in YES, and Step 4 ends.

The trace list is not updated and the search ending condition is not satisfied at Step 405 once again, and the processing branches to Step 403.

Next at Step 403, the trace to be processed is a trace corresponding to the node 204. Since there is no other matching node at Step 4041 (when only the chained functions structure of the condition part of the meaning structure changing rule shown in FIG. 12 is taken into account), the processing branches to Step 4044.

Since the node 204 can be searched in the chained functions structure which it belongs to originally and the node 204 is not an "EQU" node or an attribute name node, NO is selected at Step 4044 and the processing branches to Step 4045.

Since the node 204 is not a functional node, NO is selected at Step 4045 and the processing branches to Step 4047.

At Step 4047, the trace of the direction proceeded by a step in the direction of the link connection is added to the trace list. In this case, only a trace is added. Namely, the trace information a is the node 204, and the trace information b is the node "ISA" 202, and the trace information c is "3" and the trace information d is "1" (this is a copy of the value of the trace information d of the node 204), and the trace information e is data which is the same as that of the trace information e of the node 204.

When the loop from Step 403 to Step 405 is repeated like this, the trace corresponding to the node 203 (searching distance 4) and the trace corresponding to the node 201 (searching distance 4) are added to the trace list on the basis of the trace corresponding to the node 202 and furthermore, the trace corresponding to the node 200 (searching distance 5) is added to the trace list on the basis of the trace corresponding to the node 201.

Figure 15:
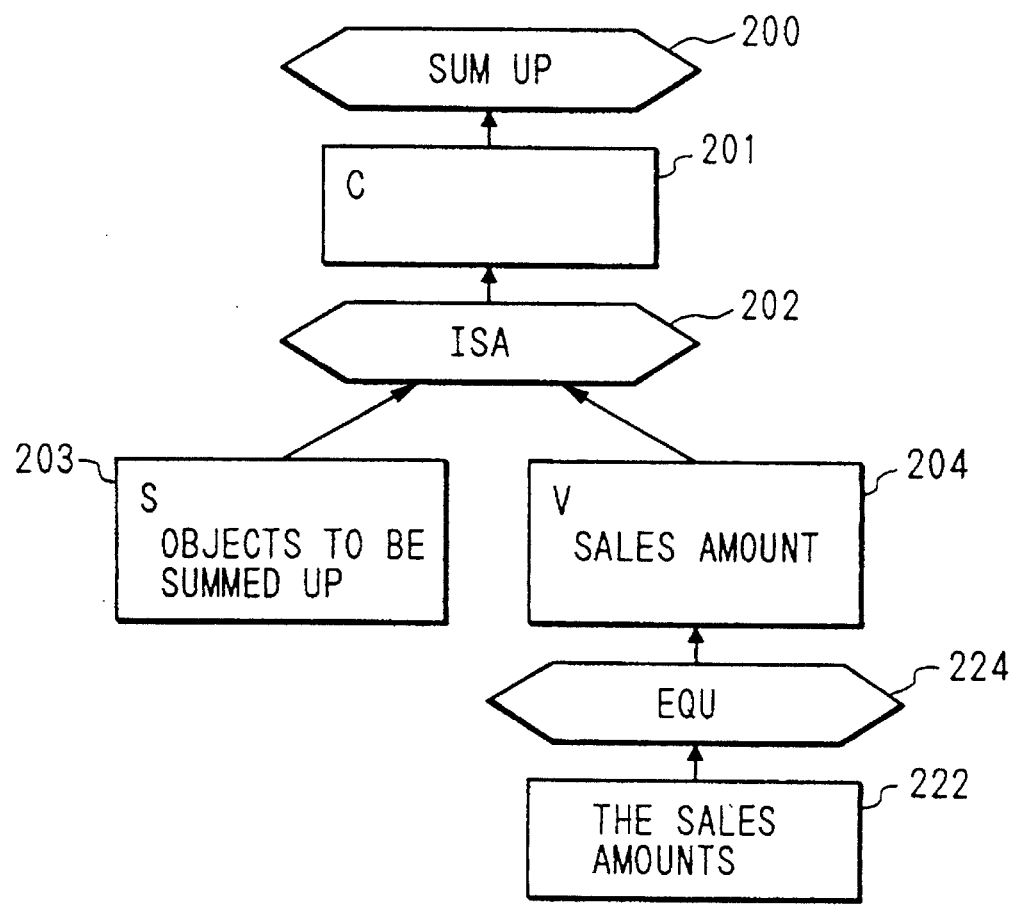
FIG. 15 is a drawing showing an actual example of the "chained functions structure" which is obtained as a result of semantic analysis of a natural language text of "Sum up the sales amounts".

When the trace corresponding to the node "sum up" 200 is added to the trace list, since the node matches with the search ending node 221, the search ending condition is satisfied at Step 405. FIG. 15 shows a chained functions structure on the basis of the searching path which is obtained as a result of the above network walk for search. FIG. 15 is equivalent to the meaning representation of the first half of the given input text 220.

Next at Step 406, whether it is necessary to re-analyze or not is confirmed for the user. Assuming that the user inputs a message indicating that there is no need to reanalyze, the processing at Step 4 ends.

Next, the execution command, command template, and new character string in natural language included in the consequent part of the meaning structure changing rule which are used for the network walk for search at Step 4 are pushed in to the stack so as to use them at Steps 6 to 9 (Step 5).

In this case, a concrete value is substituted to the slot value of the command template so as to convert to a command which can be executed. Although "and print the result" is already pushed in to the stack, the new character string in natural language is pushed in so as to be fetched first.

The meaning structure changing (Step 5) will be explained more in detail.

At Step 500, it is determined to start the processing from Step 501 to Step 505 on the basis of the trace corresponding to the node 200 which is obtained at Step 4.

Since the node 200 which is the trace information b of the trace determined at Step 500 is a functional node of the condition part of the meaning structure changing rule, the processing branches to Step 502 (Step 501).

In the consequent part of this meaning structure changing rule, new character strings in natural language 205 to 207 are defined. Since the command template is not defined, the processing branches to Step 504.

At Step 504, the new character strings in natural language 205 to 207 are stored (pushed in) on the stack so that they are fetched (popped) in this order. The mechanism of this stack can be realized by the well-known technique, so that detailed description will be omitted.

Next at Step 505, whether there is another trace to be processed is checked. Generally, the searching starts from the trace corresponding to the node 200 and returns the searching path on the basis of the trace information a, and the trace corresponding to a functional node which is detected halfway is assumed as a trace to be processed at Step 505. However, since there exists no relevant trace in this example, Step 5 ends.

Next, since there exists no execution command in the stack obtained at Step 5, the processing branches to Step 8 (Step 6).

Next, since there exist the character strings in natural language 205 to 207 and "and print the result" in the stack obtained at Step 5, the character string 205 is fetched (popped) first and the processing branches to Step 9.

The algorithm of Step 9 is the same as that of Step 2. Therefore, the natural language analysis 2 is mounted in the computer and the natural language analysis 9 is executed by calling the above natural language analysis recursively.

The recursive call mechanism can be realized by the well-known technique, so that detailed explanation will be omitted.

Next, a natural language analysis is executed by using the character string "Retrieve the sales amount" 205 as an input natural language text (Step 2).

Figure 16:
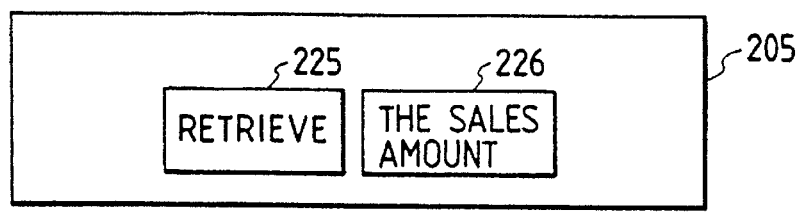
FIG. 16 is a drawing showing an example that a natural language text of "Retrieve the sales amount" is split into phrases.

At Step 3, the natural language text 205 is subjected to morphological analysis and disambiguation using the dictionary 10. In this example, phrases of "retrieve" and "the sales amount" are recognized as nodes 225 and 226 are allocated to them respectively as shown in FIG. 16. The information of the dictionary shows that "the sales amount" is an operating object condition node and "retrieve" is a functional node.

Next, the semantic analysis (Step 4) will be explained in detail using the knowledge 11.

FIG. 13 shows an actual example of the meaning structure changing rule which is defined in the knowledge 11 beforehand. Namely, a chained structure changing rule which is equivalent to the meaning of "retrieve (something)" is defined in the condition part of this meaning structure changing rule.

Namely, it is represented that the condition part is a function "retrieve" 208 for inputting a condition 209 that an attribute name "field" 211 is an attribute value "(value X)" 212.

In this case, the relationship between the attribute name "field" 211, the attribute value "(value X)" 212, and the condition 209 is represented by a function "ISA". (value X) is a variable of each of the nodes 212 and 218 and both variables are the same value. The (value X) is the value of the attribute value node which is detected (generally for the first time) when returned reversely on the searching path until the trace in which at least one node among the nodes on the same chained functions changing rule (nodes 208 to 212) is the trace information a is obtained on the basis of the trace. Particularly, the value of an attribute value node in the instantiation data is desirable. A value which is used also as an attribute name is not desirable. Or, the (value X) is a value which can be taken out of the chained functions structure relating to nodes on the searching path.

The consequent part of this meaning structure changing rule is a chained functions structure which is to be added to the trace information e of the trace when the condition part is used for network walk for search. Actually, only pointers for indirectly instructing a series of chained functions structures from the node 213 to the node 218 to the trace information e from a viewpoint of the memory efficiency.

In the consequent part of the meaning structure changing rule, a command template "Select (value X)" is also defined. This is a template in the command language for operating the decision support system. A value which is the same as that of the node 212 is entered in the (value X) field.

FIG. 5 shows an actual example of knowledge of the data base structure which is defined in the knowledge 11 beforehand. FIG. 6 shows an actual example of knowledge of the broader and narrower relationship of the system which is defined in the knowledge 11 beforehand.

First at Step 400, since the processing is an analysis for obtaining a first analytical candidate of the meaning of the character string in natural language, the trace list is made null and the processing branches to Step 401.

Next, at Step 401, a combination of a functional node and operating object condition node which are to be processed is determined on the basis of the two nodes ("the sales amount" and "retrieve") which are obtained up to Step 3.

A combination of the operating object condition node "the sales amount" and functional node "retrieve" is detected from the syntactic relationship. In the subsequent processing, "the sales amount" is handled as a search starting node and "retrieve" as a search ending node.

Next at Step 402, as mentioned above, a trace is constructed for the search starting node "the sales amount". However, a chained functions structure which is equivalent to the knowledge of the knowledge 11 which can be used at present is given to a set of chained functions structures which can be searched at the next step.

In this explanation, at least the chained functions structure shown in FIGS. 5 and 6 and the chained functions structure of the condition part of the meaning structure changing rule shown in FIG. 13 are assumed to be given. The trace which is obtained like this is added to the trace list.

Next, to process unprocessed traces in the trace list at Step 403, the processing branches to Step 404.

Next, Step 404 will be explained more in detail.

First at Step 4041, nodes which match with the node 226 are detected from the nodes (nodes 110 to 122 and 208 to 212) included in the trace information e. In this case, the independent words of natural language expression of the node "the sales amount" 226 match with those of the node "sales amount" 115.

When the loop from Step 403 to Step 405 is repeated in the same way as mentioned above, the traces corresponding to the following nodes are added to the trace list one by one. They are the functional node "EQU" (searching distance "1" up to this node) (the content of the parentheses is repeated hereinafter), attribute value node "sales amount" ("2"), functional node "ISA" ("3"), attribute name node "1st field" ("4"), condition node ("4"), functional node "EQU" ("5"), functional node "HAP" ("5"), attribute value node "1st field" ("6"), operating object node "record file" ("6"), functional node "ISA" ("7"), attribute name node "field" ("8"), functional node "EQU" ("9"), attribute name node "field" ("10"), functional node "ISA" ("11"), condition node ("12"), and functional node "retrieve" ("13").

When the trace corresponding to the node "retrieve" 208 is added to the trace list, since the node matches with the search ending node 226, the search ending condition is satisfied at Step 405.

Figure 17:
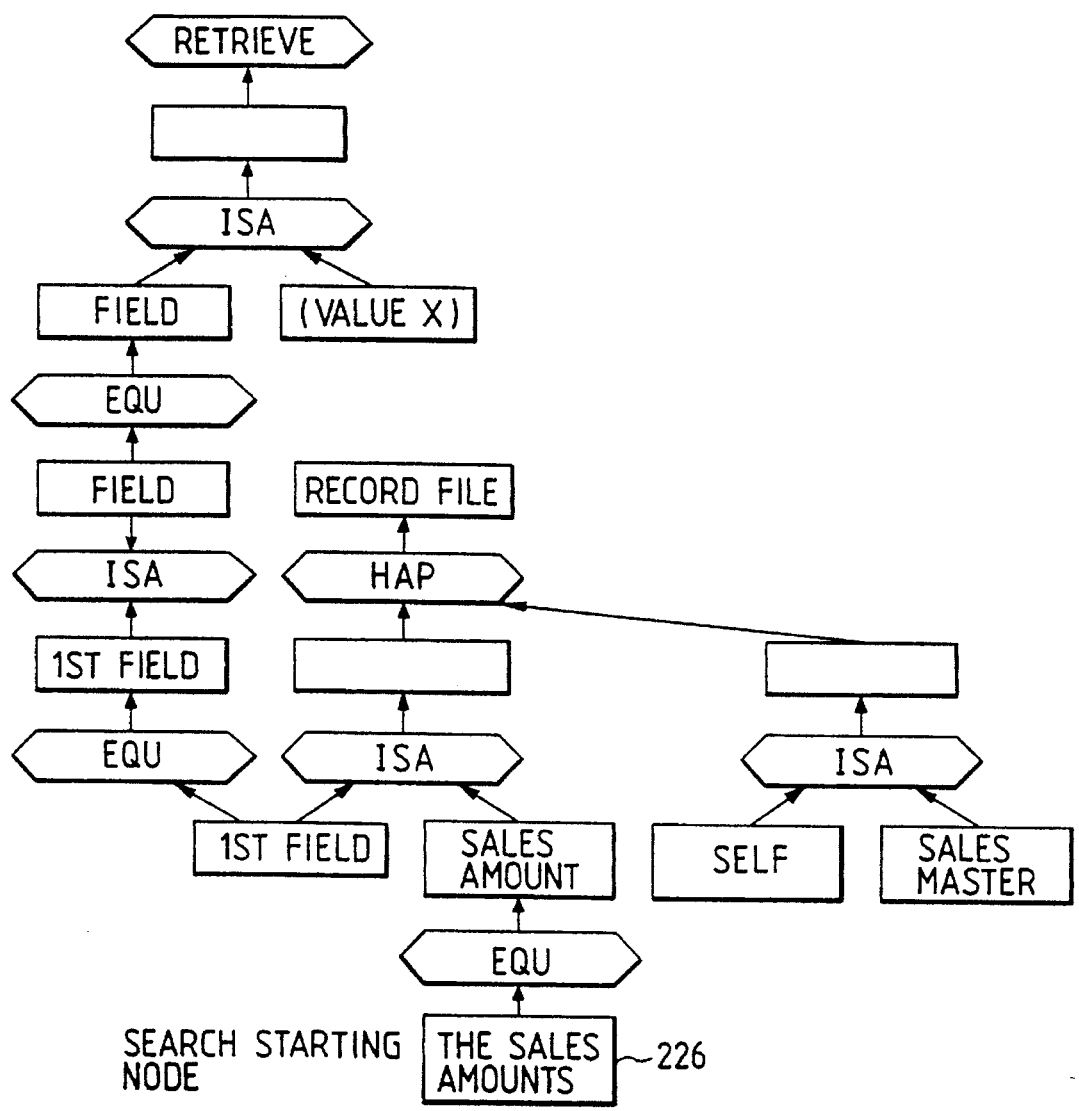
FIG. 17 is a drawing showing an actual example of the "chained functions structure" which is obtained as a result of semantic analysis of a natural language text of "Retrieve the sales amount".

FIG. 17 shows a chained functions structure on the basis of the searching path which is obtained as a result of the above network walk for search. FIG. 17 is equivalent to the meaning representation of the given input text 205. At Step 406, assuming that a message indicating that there is no need to re-analyze is inputted, Step 4 ends.

Next, at Step 500, it is determined to start the processing from Step 501 to Step 505 on the basis of the trace corresponding to the node 208 which is obtained at Step 4. Since the node 208 which is the trace information b of the trace determined at Step 500 is a functional node of the condition part of the meaning structure changing rule, the processing branches to Step 502 (Step 501).

In the consequent part of this meaning structure changing rule, a command template "Select (value X)" 219 is defined, so that the processing branches to Step 503.

Next at Step 503, a suitable value is substituted to a slot (value X) of the command template. For example, it is the value of an attribute value node which is detected when returned reversely from a trace (for example, the trace corresponding to the node 211) in which one of the nodes 208 to 212 is the trace information a.

In this case, "sales amount" can be detected. Therefore, "Select sales amount" can be obtained as an execution command. When necessary, that this "sales amount" is managed by "sales master" in the data base and is "1st field" of the "sales master" can be easily obtained on the basis of this trace (FIG. 17).

Next at Step 504, the execution command which is obtained at Step 503 is stored (pushed in) on the stack. As to the stack, it is assumed that when the natural language analysis 9 is recursively called, the old stack is saved and a new stack is prepared.

Next, since there exists no more trace to be processed at Step 505, Step 5 ends.

Next, since there is an execution command in the stack which is obtained at Step 5, it is fetched (popped) and the processing branches to Step 7 (Step 6).

Next at Step 7, the execution command is executed. This execution means the start of execution of the decision support system but does not always mean the end of the command. Next, the processing goes to Step 6. Since there is no execution command on the stack, the processing branches to Step 8.

Next at Step 8, since there is no new character string in natural language on the stack, the natural language analysis 9 which is recursively called ends.

Now, the processing returns to the original natural language analysis 2. Namely, the processing restarts from Step 6 using the data of the stack which is saved once. There are the natural language texts 206 and 207 and "and print the result" on the stack at present. Since there is no command language on the stack, the processing branches to Step 8.

Next at Step 8, the natural language text "Sum up per every month" 206 is fetched (popped). An execution command corresponding to this natural language text 206 is also generated and the decision support system executes it. By repeating this processing, the natural language text "Graphize this" 207 and "and print the result" are processed sequentially. Those who are skilled in the art of the field of the present invention will be able to easily understand that the aforementioned three texts (or fragments thereof) can be processed in the same way from the aforementioned detailed explanation.

When the input text "Sum up the sales amount and print the result" is all interpreted and the newly developed character string in natural language on the stack is exhausted like this, the processing branches so as to terminate the natural language analysis 2 at Step 8.

When FIGS. 5, 6, 12, and 13 are given for the knowledge 11 in the above example, there are two matching destinations, that is, the nodes 115 and 204 from the node "the sales amount". Therefore, the trace branches and the individual branches perform network walk for search. According to the above explanation, the searching is executed step by step on the basis of the searching distance, so that each branch is searched like a search with priority of width. After all, a branch which satisfies (or previously satisfies) the search ending condition can be detected, so that even if the knowledges shown in FIGS. 5, 6, 12, and 13 are given to a set of chained functions structures which can be searched simultaneously, a correct semantic analysis can be performed.

By doing this, it is possible to analyze the meaning of an input natural language text and to develop it to a natural language for explaining (or expressing in other words) it on the basis of the result of semantic analysis.

Therefore, when knowledge of the relationship between basic words and command language is given beforehand, only by representing or composing those basic words in a different natural language, a user can define more complicated task or knowledge simply.

Particularly according to this method, by providing knowledge of the relationship between basic words and command language by a skilled hand beforehand, an end user can operate an application system if he understands how to use the basic words (in natural language) even if he does not know the command language depending on the application system at all.

Even if an end user does not know a complicated command language system, operation system, and data structure system which vary every application in detail, he can operate the application precisely through natural language.

Therefore, according to the present invention, the natural language can be used as a kind of programming language.

Namely, even if a natural language text inputted by a user is macro representation for an application system, by developing the text to a natural language text for explaining the representation on the basis of the knowledge which is defined beforehand, he can operate the application suitably.

An application which does not have processing of "Sum up the sales amounts" as an executable command language as shown in the above example can be operated indirectly by developing the text to three texts for explaining the representation such as "Retrieve the sales amount" "Sum up per every month" and "Graphize this" and analyzing and executing each natural language text. By defining other complicated natural languages using the basic natural language like this, knowledge can be easily constructed like a language dictionary.

Even if a natural language text inputted by a user is representation for designating a goal (for example, "Summed-up result of the sales amounts is wanted"), the text is developed to a natural language for explaining the meaning on the basis of the result of semantic analysis. Therefore, even if an input text is a text by representation similar to a conversational statement, an application can be operated suitably. For example, representation "Summed-up result of the sales amounts is wanted" for designating a goal is equivalent to "Sum up the sales amounts" in meaning, so that it can be processed in the same way as with the present invention.

According to the present invention, various types of knowledge such as knowledge depending on the domain, knowledge of the system, knowledge of an application, and knowledge depending on a discourse are described in the same representation format (chained functions structure).

Therefore, a plurality of knowledges can be used suitably not for reasons of the processing procedure and new meaning representation (FIG. 17) can be constructed simply by composing those knowledges.

Since various types of knowledge are described in the same representation format, editors and functions for maintaining those knowledges can be shared. Therefore, the development man-hours of those editors and functions are reduced. Since the editor use method is standardized, the user's knowledge maintenance procedure is improved.

According to this embodiment, the meaning representation which is a result of semantic analysis is obtained by simple connection of knowledges which are given beforehand.

Therefore, the algorithm of the semantic analysis is efficient compared with the processing method for outputting a different meaning representation format. By using the same information on the memory of the computer (or a simple copy), the memory consumption is reduced and the processing is speeded up.

The meaning representation is also a chained functions structure, so that by storing the meaning representation as history knowledge, it can be referred to by the semantic analysis in the same way as knowledge which is represented in another chained functions structure.

According to this embodiment, while the first half of a text is being analyzed, the latter half of the text is saved on the stack once. By doing this, it is possible to analyze the meaning of analysis of the first half, to generate and execute a command language corresponding to the meaning, and to analyze the meaning of the latter half of the text which is saved in advance using the result. Therefore, even when the latter half of a text is indeterminate and depends on the execution result of the first half of the text, the present invention is effective.

As a result of the semantic analysis, by generating a new character string in natural language or command language as well as generating knowledge for updating knowledge (namely, outputting knowledge necessary for analyzing the latter half of a text or analyzing the text after development synchronously), a more precise semantic analysis can be executed.

An example of a single decision support system is shown as an application of this embodiment. A command language for a system which is operated by a command language such as another data base retrieval system, expert system, or operating system can be easily generated because only one thing to do is to rewrite the consequent part of the meaning structure changing rule with the command template of the system.

Furthermore, even when command language systems are generally a plurality of different systems like the aforementioned systems, the features of the data format of those systems and the conversion procedure for the data format can be described in the knowledge 11. Therefore, a linked operation of a plurality of systems can be realized.

For example, when the meaning of "forecast" is defined that the data base retrieval system retrieves and sums up necessary data and the expert system infers and displays it, the relevant command templates of those systems can be described mixedly in the consequent part of the meaning structure changing rule. Therefore, synchronous operations can be performed for a plurality of application softwares.

Since knowledge has a common representation format (chained functions structure), a plurality of command language systems can be operated synchronously. For example, knowledge of a common discourse can be shared with a plurality of application softwares via data transfer.

As a transformation example of the aforementioned embodiment, an actual example of the semantic analysis 4 when a user designates re-analysis as a result of semantic analysis and the meaning of the second and subsequent candidates are also analyzed will be explained.

Figure 18:
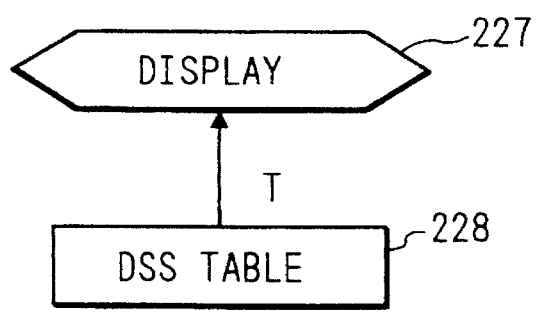
FIG. 18 is a drawing showing an actual example of the "condition part" of the "meaning structure changing rule" which defines "Display a DSS table".

FIG. 18 shows an actual example of the condition part of the meaning structure changing rule which is defined in the knowledge 11 beforehand. Namely, in the condition part of this meaning structure changing rule, a chained functions structure which is equivalent to the meaning of "Display a DSS table" is defined. Namely, it is represented that the condition part is a function "display" 227 for inputting an operating object "DSS table" 228.

Figure 19:
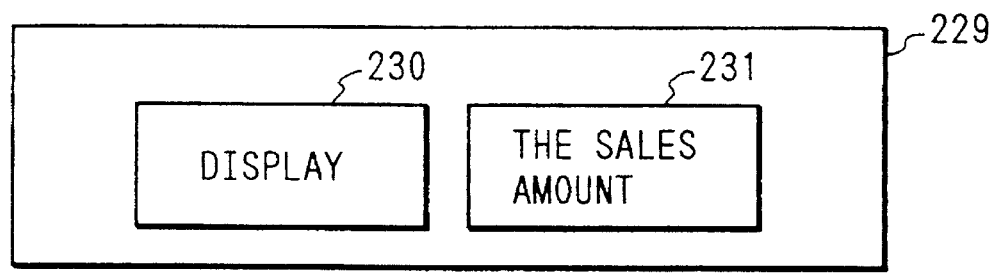
FIG. 19 is a drawing showing an example that a natural language text of "Display the sales amount" is split into phrases.

As to an input text "Display the sales amount" 229 shown in FIG. 19, the processing up to Step 3 shows that a text "the sales amount" 231 is an operating object condition node and a text "display" 230 is a functional node.

First, since the processing is an analysis for obtaining a first analytical candidate of the meaning of the character string in natural language, the trace list is made null (Step 400) and the node "the sales amount" 231 is handled as a search starting node and the node "display" 230 as a search ending node (Step 401).

Next at Step 402, as mentioned above, a trace is constructed for the search starting node "the sales amount" 231. However, a chained functions structure which is equivalent to the knowledge of the knowledge 11 which can be used at present is given to a set of chained functions structures which can be searched at the next step. In this explanation, at least the chained functions structure shown in FIGS. 5, 6, and 8 and the chained functions structure of the condition part of the meaning structure changing rule shown in FIGS. 13 and 18 are assumed to be given. The trace which is obtained like this is added to the trace list.

Figure 20:
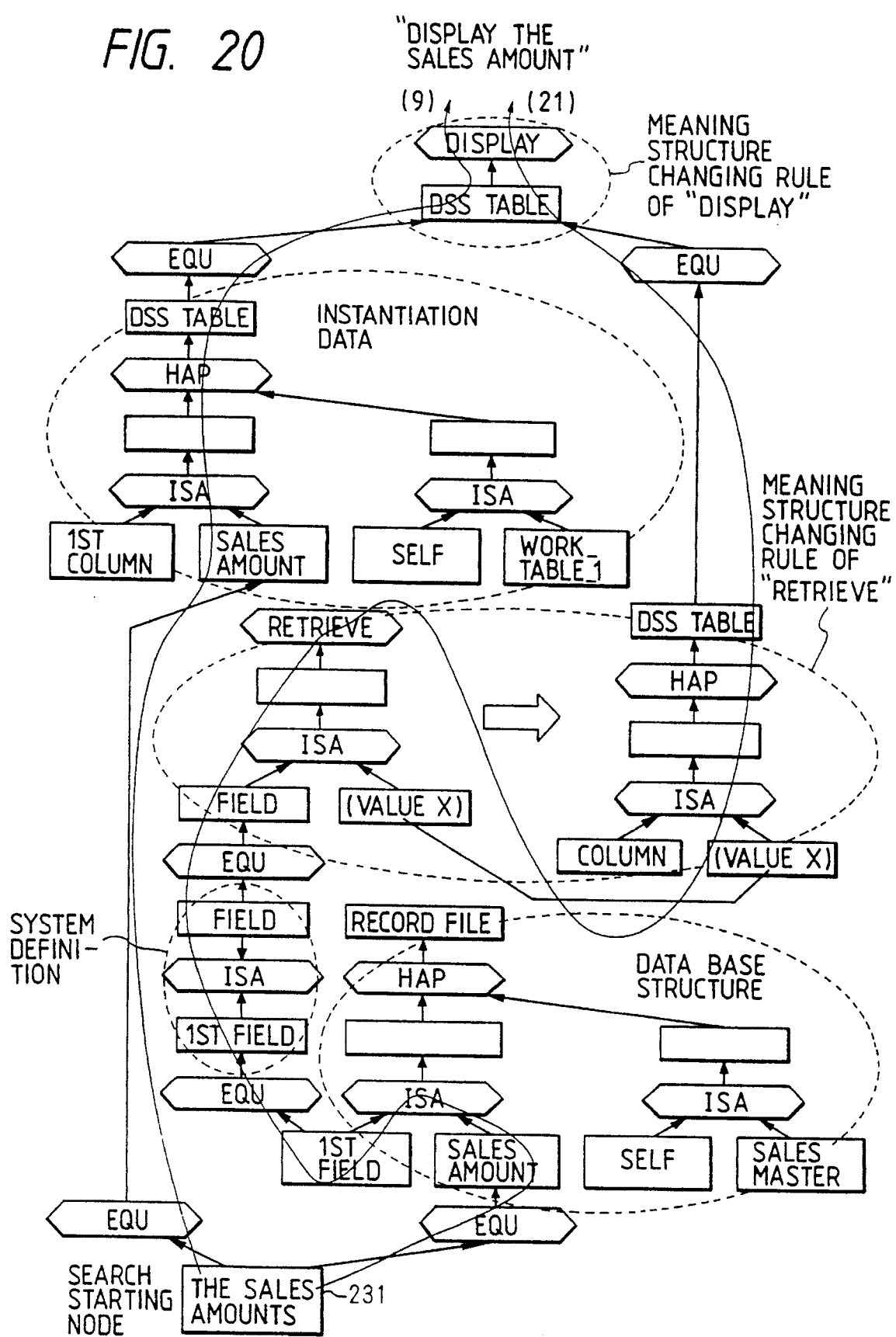
FIG. 20 is a drawing showing an actual example of the "chained functions structure" which is obtained as a result of semantic analysis of a natural language text of "Display the sales amount".

When the network walk for search is performed as shown by the aforementioned explanation, the searching path (the path on the left in FIG. 20) using the instantiation data (FIG. 8) and the condition part of the meaning structure changing rule (FIG. 18) satisfies the search ending condition at the time that the searching distance is "9" (Step 405). Therefore, it is assumed as a first candidate of meaning.

In this connection, this searching path represents a meaning of "Display DSS table which is named work table 1 having the sales amount as 1st column". It is assumed that when whether this meaning is acceptable or not is confirmed for a user (Step 406), the user requests designation of reanalysis. In this case, the processing branches to Step 400. Since re-analysis is designated already at Step 400, the processing branches to Step 403 immediately.

Next at Step 403, the analysis restarts in the state that the variable state at the time that the searching distance is "9" is stored. Therefore, the network walk for search is continued for the traces in the trace list in which the searching distance is at least "10". At the time that the searching distance is "13" the network walk for search is executed starting from the trace corresponding to the functional node "retrieve" 208 (FIG. 13) (Step 404).

In this case, the chained functions structure of the consequent part of the meaning structure changing rule to which this functional node belongs is added to the trace information e of this trace (Step 4046) and the attribute value node (namely, the node 218 (FIG. 13)) included in the chained functions structure is added to the trace list as a new trace (Step 4047).

By rewriting the content of the trace information e using the consequent part of the meaning structure changing rule like this, knowledge which can be referred to depending on a discourse can be broadened or narrowed. This is equivalent to performing a part of a kind of focus tracking in the discourse.

Furthermore, when the network walk for search is continued, the searching path (the path on the right in FIG. 20) using the knowledge of the data base (FIG. 5), the knowledge of the broader and narrower relationship in the system (FIG. 6), the meaning structure changing rule (FIG. 13), and the condition part of the meaning structure changing rule (FIG. 18) satisfies the search ending condition at the time that the searching distance is "21" (Step 405). Therefore, it is assumed as a second candidate of meaning.

In this connection, this searching path represents a meaning of "Retrieve sales master having the sales amount as a first field and display DSS table having the sales amount in column as a result thereof". When the user inputs a message indicating that it may be executed in this meaning (Step 406), the processing goes to Step 5.

As to the processing when the user requests another interpretation at Step 5 and the subsequent steps and Step 406, it will be understood that it may be performed in the same way from the aforementioned detailed explanation without further explanation.

As the amount of knowledge is increased like this, a plurality of searching paths exist. Therefore, when the user is not satisfied with the first analytical result (the first candidate of meaning), by lengthen the distance of searching path as shown in this embodiment, another candidate of meaning can be detected by reusing the cumulative analysis information effectively. According to the present invention, by repeating the above processing, analytical candidates of meaning can be presented one by one until the user is satisfied.

A natural language text which is inputted by a user generally contains many omissions. Therefore, it is practically necessary to compensate for a certain amount of omissions for natural language analysis. According to the present invention, by setting the distance of searching path as a parameter of searching condition, the degree of compensation for omission representation can be adjusted. According to the present invention, depending on an increase in the calculation time or memory consumption, an analytical result compensating for more omissions can be outputted. When the batch processing is used for natural language analysis, knowledge which is obtained by the natural language analysis and execution result of the command language may not be used intentionally. By ignoring knowledge which is generated during the natural language analysis like this method, compiling can be executed as a natural language analysis containing the natural language text which is input data and the processing can be speeded up.

As a further transformation example of the aforementioned embodiment, an example that an operating object and condition are distinguished from each other depending on a command will be explained hereunder. The steps other than the semantic analysis 4 are the same as the aforementioned explanation, so that detailed explanation will be omitted.

Figure 21:
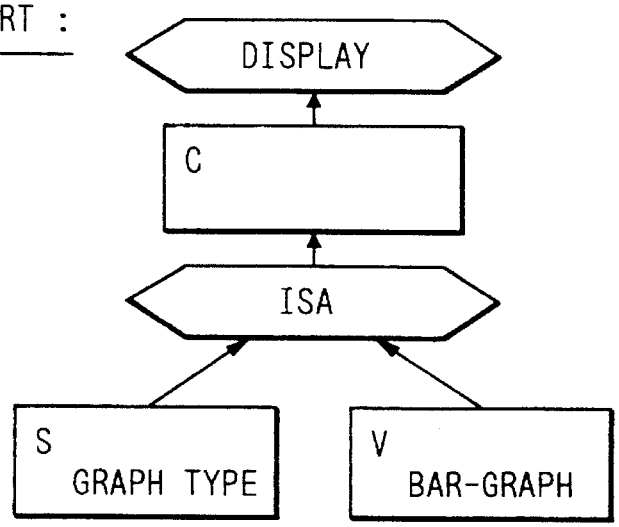
FIG. 21 is a drawing showing an actual example of the condition part of the "meaning structure changing rule" which defines "Display in a bar-graph".

FIG. 21 shows an actual example of the condition part of the meaning structure changing rule which is defined in the knowledge 11 beforehand. Namely, in the condition part of this meaning structure changing rule, a chained functions structure which is equivalent to the meaning of "Display in a bar-graph" is defined.

Namely, it is represented that the condition part is a function "display" 232 for inputting a condition 233 that an attribute name "graph type" 235 is an attribute value "bar-graph" 236. In this case, the relationship between the attribute name "graph type" 235, the attribute value "bar-graph" 236, and the condition 233 is represented by a function "ISA".

Figure 22:
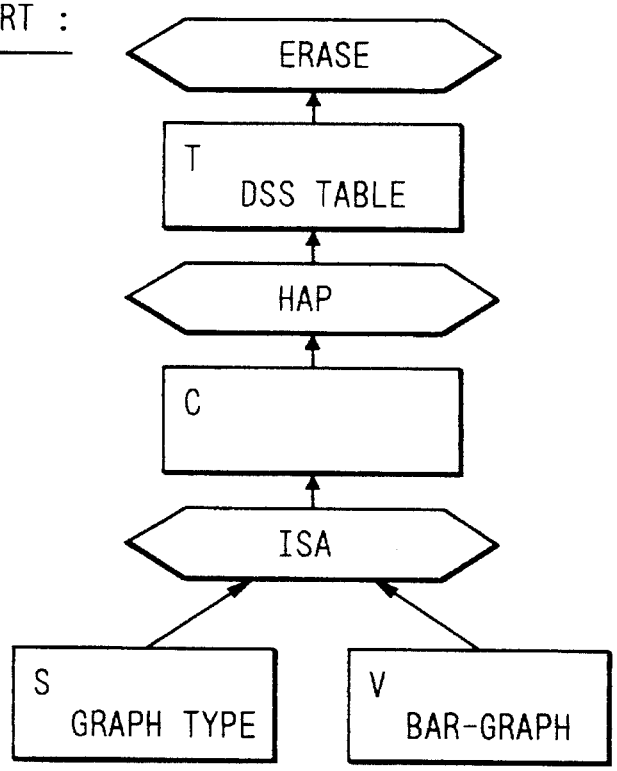
FIG. 22 is a drawing showing an actual example of the "condition part" of the "meaning structure changing rule" which defines "Erase an operating object in a bar-graph".

FIG. 22 shows an actual example of the condition part of the meaning structure changing rule which is defined in the knowledge 11 beforehand. Namely, in the condition part of this meaning structure changing rule, a chained functions structure which is equivalent to the meaning of "Erase the operating object which is a bar-graph" is defined.

Namely, it is represented that the condition part is a function "erase" 237 for inputting an operating object 238 having a condition 240 that an attribute name "graph type" 242 is an attribute value "bar-graph" 243. In this case, the relationship between the attribute name "graph type" 242, the attribute value "bar-graph" 243, and the condition 240 is represented by a function "ISA". The relationship between the condition 240 and the operating object 238 is represented by a function "HAP".

At least the chained functions structures of the condition part of the meaning structure changing rule shown in FIGS. 21 and 22 in the knowledge 11 are given to a set of chained functions structures which can be searched.

Figure 23:
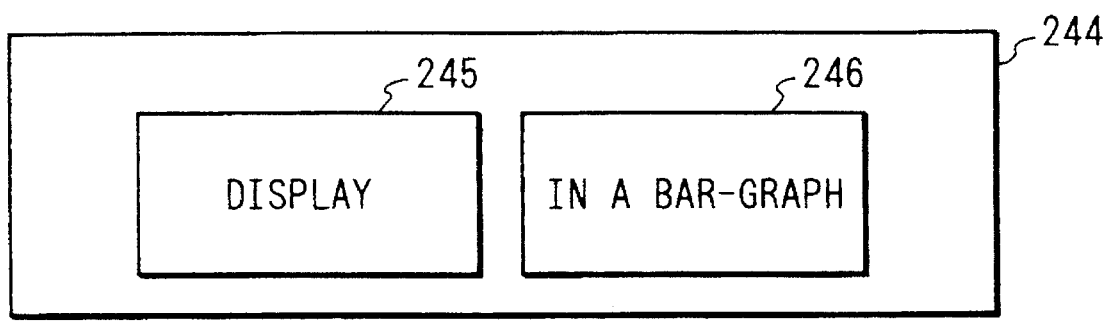
FIG. 23 is a drawing showing an example that a natural language text of "Display in a bar-graph" is split into phrases.

As to a natural language text "Display in a bar-graph" 244 shown in FIG. 23, the processing up to Step 3 shows that a text "in a bar-graph" 246 is an operating object condition node and a text "display" 245 is a functional node.

Figure 25:
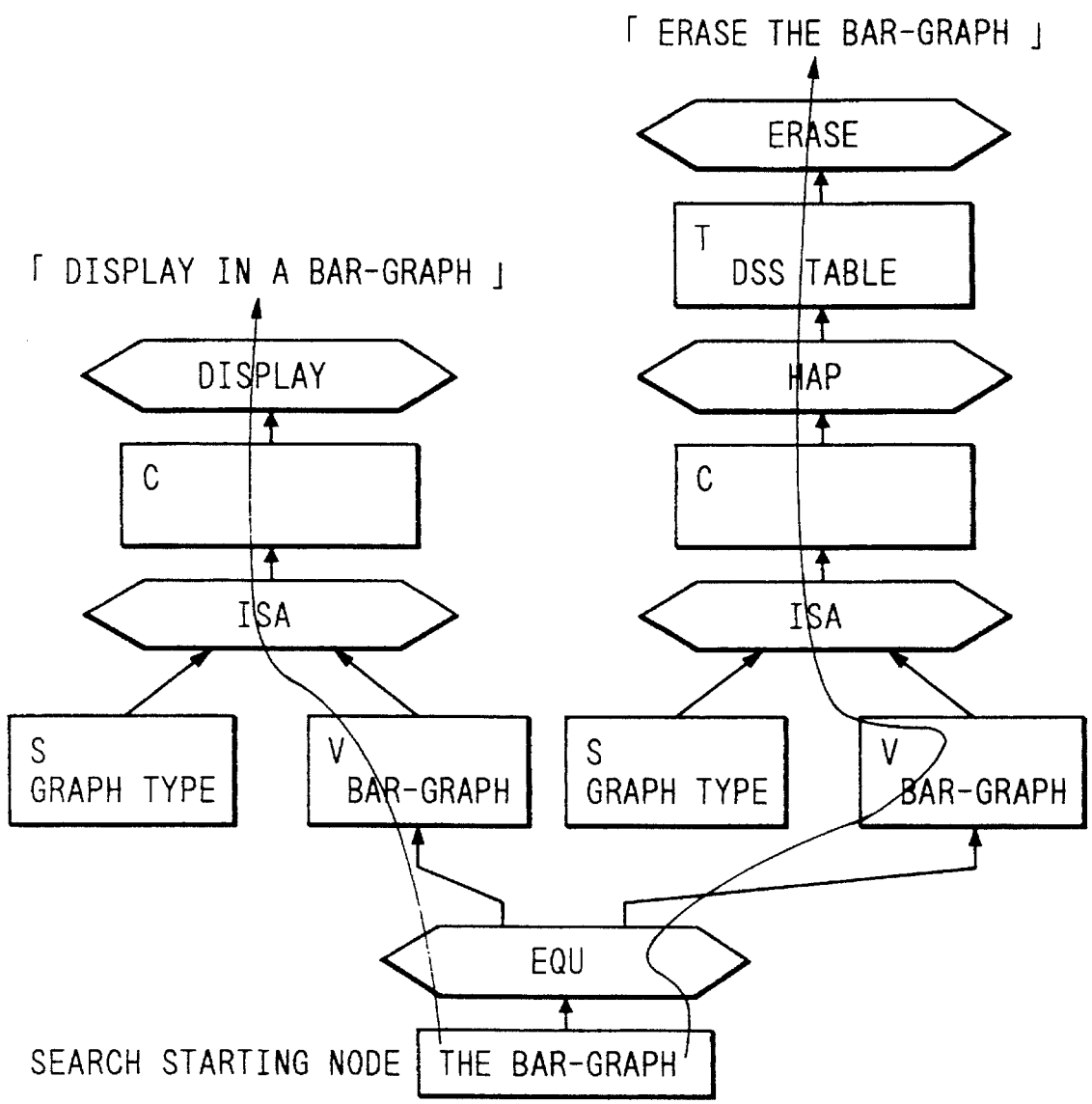
FIG. 25 is a drawing showing an actual example of the "chained functions structure" which is obtained as a result of semantic analysis of natural language texts of "Display in a bar-graph" and "Erase the bar-graph".

When the searching starts from the search starting node "in a bar-graph" 246 and ends at the search ending node "display" 245 under the above knowledge (FIGS. 21 and 22), only the searching path on the left in FIG. 25 satisfies the search ending condition as a result of semantic analysis.

This searching path means that the command "display" handles the natural language expression "bar-graph" as a condition.

Figure 24:
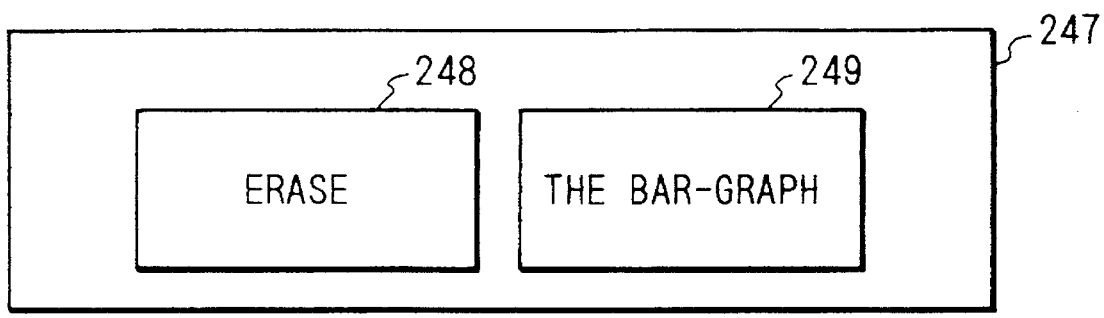
FIG. 24 is a drawing showing an example that a natural language text of "Erase the bar-graph" is split into phrases.

When a natural language text "Erase the bar-graph" 247 is considered under the same knowledge as shown in FIG. 24, the processing up to Step 3 shows that a text "the bar-graph" 249 is an operating object condition node and a text "erase" 248 is a functional node.

When the searching starts from the search starting node "the bar-graph" 249 and ends at the search ending node "erase" 248 under the above knowledge (FIGS. 21 and 22), only the searching path on the right in FIG. 25 satisfies the search ending condition as a result of semantic analysis. This searching path means that the command "erase" handles the natural language expression "bar-graph" as an operating object.

As mentioned above, according to the semantic analysis of the present invention, the meaning of a difference of natural language representation ("the bar-graph" in this example) for which the handling (an operating object and condition in this example) depends on the content of a command can be analyzed.

According to the embodiments and transformation examples which are explained above, good results indicated below can be obtained.

When it is hard to generate a command language simply (directly) by analyzing the meaning of a natural language text, a suitable command language can be generated by replacing the meaning of the natural language text with a new different character string in natural language.

Since the representation format of knowledge such as knowledge of the application command system, knowledge of the system, and another natural language text (it may be a so-called language dictionary) for explaining (or expressing in other words) the meaning of a natural language text is standardized and a semantic analysis for using the knowledge is provided, by integrating those knowledges even if they are provided by different users, a command language and the content thereof can be determined suitably.

For the same reason as above, without understanding the complicated command language system which varies with an application, the operating system (operating sequence, alternative operation, etc.), and the data structure system in detail, an end user can operate applications (general computer applications including data base retrieval and job execution and controlling plants and airplanes by computers).

By defining the natural language which means such a series of operations in a new different natural language, the end user can execute a desired operation simply. This indicates that the present invention can also provide a programming function in natural language.

When most basic words are given knowledge of corresponding command languages, only by composing those basic words, the user can define more complicated task. Therefore, even if the end user really does not know the command language depending on the application software, he can operate the application if he understands how to use only the basic words (which are a natural language).

Furthermore, when analyzing the meaning of a natural language text, the end user can perform a semantic analysis requiring a complicated combination of various types of knowledge. For example, whether a word of "sales amount" in a natural language text indicates a specific field in the record file of the data base or a specific column in the DSS table which is handled by the decision support system, can be identified.

Furthermore, the present invention can be used as an interface which can be applied to a wide range of applications. The processing for maintaining knowledge can be shared due to standardization of the knowledge representation format and the operability is improved due to the standardization of knowledge maintenance. Therefore, by sharing the above natural language processing, the man-hour for applying the natural language interface to applications can be reduced.

According to the present invention, good results such that by giving input in natural language (it is generally a text but may be words) such as ordinary Japanese or English without using the formal language (special language or command which is determined for a computer) which is conventionally given to a computer and the command language (command in a predetermined format which is determined for a computer) which is defined in this embodiment, it is possible to allow the computer to perform a desired operation can be obtained.

Particularly in a computer system, even if an inputted character string cannot be converted to a command language partially, the meaning can be analyzed by adding or replacing a different character string in natural language relating to the meaning of the inputted character string.

Therefore, it can be converted to the command language of the processing to be executed finally.

Namely, as to knowledge of the relationship between a command language which is used to allow a computer to operate and a natural language, only by preparing only most primitive knowledge beforehand, a natural language text for representing a higher command can be interpreted.

What is claimed is:

1. A method of processing a natural language into a command language in a system comprising a character input means, a processor and a storage device storing a dictionary and a knowledge data base including a plurality of predefined meaning structure changing rules and a plurality of predefined chained functions structures defining expressions representative of the natural language and the command language, the method comprising:

(a) a step of inputting a character string having a natural language form representing a request for a computer operation through said input means, and storing said character string in a stack;

(b) a step performed with said processor of parsing the inputted character string into character sub-strings in accordance with said dictionary by comparing portions of the inputted character string with definitions stored in said dictionary;

(c) a step of with the processor, analyzing syntax of each of said character sub-strings by searching the knowledge data base to select corresponding chained functions structures representative of the character sub-strings;

(d) a step performed with said processor of retrieving knowledge stored in the knowledge data base in accordance with the corresponding chained functions structures selected by the analyzing syntax step (c), the retrieved knowledge defining concepts and structure of knowledge data elements representative of each syntax analyzed sub-string;

(e) a step of with said processor, character string analyzing at least one of said syntax analyzed sub-strings by searching the retrieved knowledge described by the corresponding chained functions structures including the knowledge data elements from the corresponding chained functions structures, by matching at least one of the knowledge data elements with at least one of equivalent knowledge data elements of other chained functions structures in the knowledge data base;

(f) a step of with said processor, generating an intermediate meaning structure representing each of said character string analyzed sub-strings from step (e) by combining the corresponding chained functions structures and the knowledge data elements from other chained functions structures matched in accordance with the character string analyzing step (e); and (g) a step of with said processor, generating at least one of a new character string in the natural language, an intermediate representation for obtaining a command language, and the command language which is equivalent to said syntax analyzed sub-string on the basis of said generated intermediate meaning structure, said new character string being stored in said stack, and said intermediate representation being stored in said knowledge database, and when the command language is generated, executing the command language, and when the command language is not generated, selecting a different one of said character strings from the stack and recursively repeating the processing until all of the character strings in said stack have each been subject to the generating step (g).

2. A method of processing a natural language according to claim 1, wherein said step of generating at least one of a new character string, and intermediate representation, and the command language includes a step of retrieving a meaning structure changing rule from the knowledge data base and a step of converting a generated intermediate representation in accordance with the meaning structure changing rule retrieved from said knowledge data base and the chained functions structures selected by the analyzing syntax step.

3. A method of processing a natural language according to claim 2, further comprising:

a step of generating with the processor another intermediate meaning structure in the syntax analysis step and the character string analysis step when said new character string in natural language is generated; and a step of generating at least a further new character string in natural language for said new character string, an intermediate representation for obtaining a command language, and a command language by converting the another intermediate meaning structure with reference to said meaning structure changing rule and said corresponding chained functions structures selected in the step (c).

4. A method of processing a natural language according to claim 2, further comprising:

a step included in the character string analyzing step of referring to a knowledge described in a chained functions structure including a concept as said knowledge data elements which matches with at least one of a concept for representing an operating object, a concept for representing a condition, and a concept for representing a command;

a step of recursively repeating the step of referring to a further different knowledge including a further different concept which matches with another concept than the matched concept in the step of referring; and a step of setting a combination of chained functions structures matched in the step of referring, and the step of recursive repetition, as an intermediate meaning structure.

5. A method of processing a natural language according to claim 4, wherein the matching in the step of referring, and in the step of recursive repeating is at least one of the processes of identifying an identical concept, a similar concept, a syntactic role, a broader concept of meaning, an equivalent concept of meaning, and a narrower concept of meaning.

6. A method of processing a natural language according to claim 4, further comprising:

a step of adding a plurality of chained functions structures of knowledge including a concept which matches with a certain concept to a combination of chained functions structures obtained separately, for generating separate combinations.

7. A method of processing a natural language according to claim 4, further comprising:

a step of outputting a sequence of referencing a combination of the chained functions structures, and matching points of the matching concepts, and outputting a path distance of said sequence, the path distance being a distance between a matching concept starting point and a matching concept ending point of said sequence.

8. A method of processing a natural language according to claim 7, further comprising:

a step of determining a priority of a plurality of combinations to be processed on the basis of at least one of said matching points and said path distance.

9. A method of processing a natural language according to claim 7, further comprising:

a step of ending the character string analyzing step when said path distance reaches a predesignated value.

10. A method for processing a natural language according to claim 1, wherein said new character string in natural language is at least one of a character string for expressing the meaning of a part of another character string and a character string for explaining said another character string in detail.

11. A method of processing a natural language according to claim 1, wherein the generated intermediate meaning structure is a representation comprising a part of said knowledge described in said corresponding chained functions structures.

12. A method of processing a natural language according to claim 1, wherein said chained functions structures describe at least one of a knowledge of domain, a knowledge of system, a knowledge depending on a discourse, and a meaning structure changing rule, wherein a meaning structure chaining rule being knowledge of a command language to be executed by said processor.

13. The method of processing a natural language according to claim 1, wherein the character string analyzing step determines a meaning of the at least one syntax analyzed sub-strings selected by searching the knowledge described by the corresponding chained functions structures in accordance with a concept representing operating objects of the syntax analysis, a concept representing conditions of said syntax analysis, and a concept representing commands included in said inputted natural language.

14. The method of processing a natural language according to claim 1 further including operating the system with the generated command language.

15. A method for processing a natural language according to claim 1, wherein the retrieving step retrieves a plurality of knowledges described in the corresponding chained functions structures, and the step of generating an intermediate meaning structure generates a combination of chained functions structures.

16. A computer system for running a computer program that is controlled by a command language, the computer system comprising:

input means for inputting a character string which represents command language in natural language;

storage means for storing a dictionary and a knowledge data base including a plurality of meaning structure changing rules and a plurality of chained function structures;

a processor for recursively processing each inputted character string into the command language, the processor comprising:

means for retrieving at least one of the meaning structure changing rules which is representative of the inputted character string from the storage means and applying the retrieved rules to change the inputted character string to another character string;

a syntax analyzing means for analyzing syntax of at least one of the inputted and another character strings by searching the knowledge data base to retrieve at least one of the chained function structures which corresponds to the inputted character string;

a knowledge retrieving means for retrieving knowledge from said knowledge data base described by the corresponding chained function structures, the retrieved knowledge defines a structure of knowledge data elements representative of the inputted character string;

a character string analyzing means for analyzing at least one of the inputted and the another character strings by searching (1) the retrieved knowledge described by said corresponding chained function structures and (2) the knowledge data elements from the corresponding chained function structures, the analyzing including matching at least one of the knowledge data elements with at least one knowledge data element of other chained function structures;

means for generating an intermediate meaning structure by combining said corresponding chained function structures and said other chained function structures matched in accordance with the search performed by the character string analyzing means; and means for generating at least one of a new character string in the natural language, an intermediate representation for obtaining the command language for controlling the computer program, and the command language for controlling the computer program on the basis of said generated intermediate meaning structure, wherein when a command language is not generated, the processor selects a different one of said at least one of the inputted and the another character strings, and recursively repeats the processing until the inputted character string is converted into the command language.

17. A system according to claim 16, wherein said means for generating at least one of the natural language, the intermediate representation and the command language includes a means for converting the generated intermediate representation in accordance with the meaning structure changing rules of said knowledge data base and the chained function structures.

18. A system according to claim 17, further comprising:

means for generating another intermediate meaning structure in conjunction with the syntax analysis means and the character string analysis means for said new character string when said new character string in natural language is generated; and means for generating at least one of a further new character string in natural language for said new character string, an intermediate representation for obtaining a command language, and a command language by converting the intermediate meaning structure with reference to said meaning structure changing rules and said chained function structures retrieved in the knowledge retrieving means.

19. A system according to claim 17, further comprising:

a knowledge referencing means included in the character string analysis means for referring to said knowledge described in a chained function structures including a concept and matching the concept with at least one of a concept for representing an operating object, a concept for representing a condition, and a concept for representing a command, the knowledge reference means recursively repeating the referring to a further different knowledge including a different concept which matches with another concept different than the matched concept included in the chained function structures of said referred knowledge; and means for setting a combination of chained function structures matched in the recursive repeating as an intermediate meaning structure.

20. A system according to claim 19, wherein the knowledge referencing means further identifies an identical concept, a similar concept, a syntactic role, a broader concept of meaning, an equivalent concept of meaning, and a narrower concept of meaning.

21. A system according to claim 19, further comprising:

means for adding a plurality of chained functions structures knowledge including a concept which matches with a certain concept to a combination of chained functions structures of the knowledge obtained separately, for generating separate combinations.

22. A system according to claim 19, further comprising:

means for outputting a sequence referring to a combination of the chained function structures, and matching points of the matching concepts, and a path distance of said sequence, between a matching concept of a starting point and a matching concept ending point of said sequence.

23. A system according to claim 22, further comprising:

means for determining a priority of a plurality of combinations to be processed on the basis of at least one of said matching points and said path distance.

24. A system according to claim 22, further comprising:

means for stopping the character string analysis means, when said path distance reaches a predesignated value.

25. A system according to claim 16, wherein said new character string in natural language is at least one of a character string for expressing the meaning of a part of said another character string and a character string for explaining said another character string in detail.

26. A system according to claim 16, wherein the generated intermediate meaning structure is a representation comprising a part of said knowledge described in the chained function structure.

27. A system according to claim 16, wherein said knowledge described in the chained function structures is at least one of a knowledge of domain, a knowledge of system, a knowledge depending on a discourse, and a meaning structure changing rule, said meaning structure changing rule being knowledge of a command language to be executed by said processor.

28. A system according to claim 16, wherein the knowledge retrieving means reads a plurality of knowledges described in chained functions structures, and the means for generating the intermediate meaning structure generates a combination of chained function structures.

29. A method of controlling a computer system which is controlled by a command language, with conversational statements of a natural language, the method comprising:

with an input terminal, inputting a conversational statement to request a preselected operation in a program running on the computer system;

with a processor of the computer system, converting the conversational statement into an intermediate word string using a network walk process on a plurality of nodes, each of the plurality of nodes representing values in accordance with a priori information stored in a knowledge computer memory, the stored a priori information includes at least grammatical information, dictionary information, context of the running program, and available operations of the running program, such that the intermediate word string expresses similar concepts to the conversational statement but with words from the dictionary information selected within the context of the running program;

with the processor, from the node values of the network walk process generating a chained functions structure character string representing a correspondence between the character string and the intermediate word string;

with the processor, converting the chained functions structure into a command language command;

controlling the running program with the command language command.

* * * * *